United States Patent [19]

Russell

[11] Patent Number: 5,291,471
[45] Date of Patent: *Mar. 1, 1994

[54] RECORDING/REPRODUCING SYSTEM USING PHASE ENCODING OF OPTICAL STORAGE MEDIUM

[76] Inventor: James T. Russell, 15305 SE. 48th Dr., Bellevue, Wash. 98006

[*] Notice: The portion of the term of this patent subsequent to Oct. 8, 2008 has been disclaimed.

[21] Appl. No.: 646,412

[22] Filed: Jan. 28, 1991

Related U.S. Application Data

[63] Continuation-in-part of Ser. No. 410,943, Sep. 22, 1989, Pat. No. 5,056,080, and Ser. No. 614,627, Nov. 16, 1990.

[51] Int. Cl.$^5$ ............................................. G11B 7/00
[52] U.S. Cl. .................. 369/100; 369/46.26; 369/109; 369/103; 369/112
[58] Field of Search ............ 369/59, 44.26, 100, 369/109, 124, 112, 103

[56] References Cited

U.S. PATENT DOCUMENTS 4,455,652  6/1984  Braat ........................ 369/45
5,003,526  3/1991  Bailey ....................... 369/59
5,056,080  10/1991 Russell ...................... 369/100

Primary Examiner—Jeffery A. Brier
Assistant Examiner—Robert Chevalier
Attorney, Agent, or Firm—Graybeal, Jackson Haley & Johnson

[57] ABSTRACT

Apparatus and method for encoding information and recording same as sets of spaced and variably phased marks stored on the optical record wherein the encoded information is read by illuminating each set of such recorded marks with a coherent read light to cause an optical interference pattern consisting of a varying interval and amplitude distribution of lobe maxima separated by amplitude nulls (or minimas) that change in accordance with the encoded information. This read interference pattern is detected by photosensing diode arrays and after decoding, the system outputs an information signal representing the original information. Alternative embodiments store data as variable phase encoded information only in multi-mark sets, and both phase encoded and spatial encoded data in single, variable width, variable phased marks along a record track.

28 Claims, 11 Drawing Sheets

FIG. 1 RECORDING
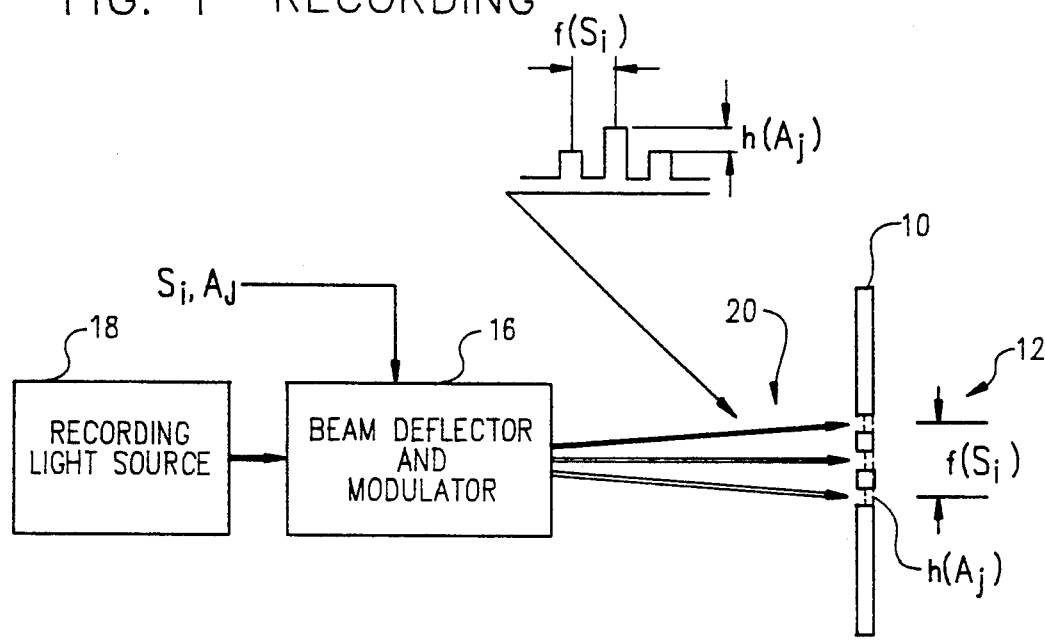
FIG. 2 READING
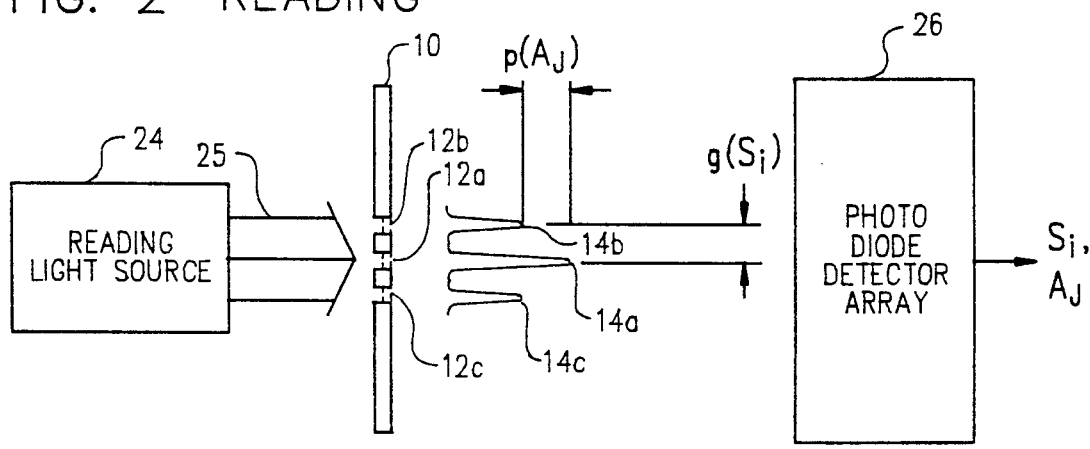
FIG. 5
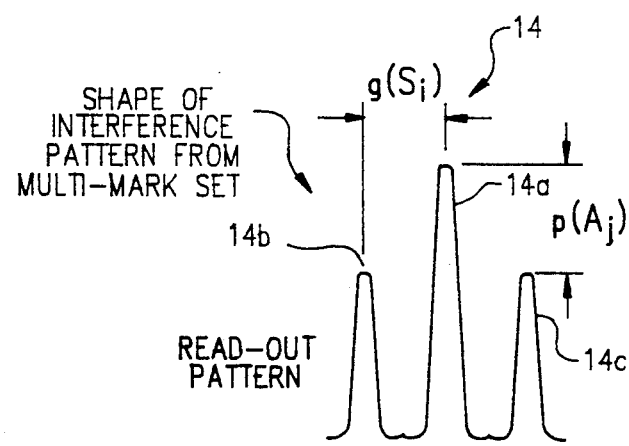

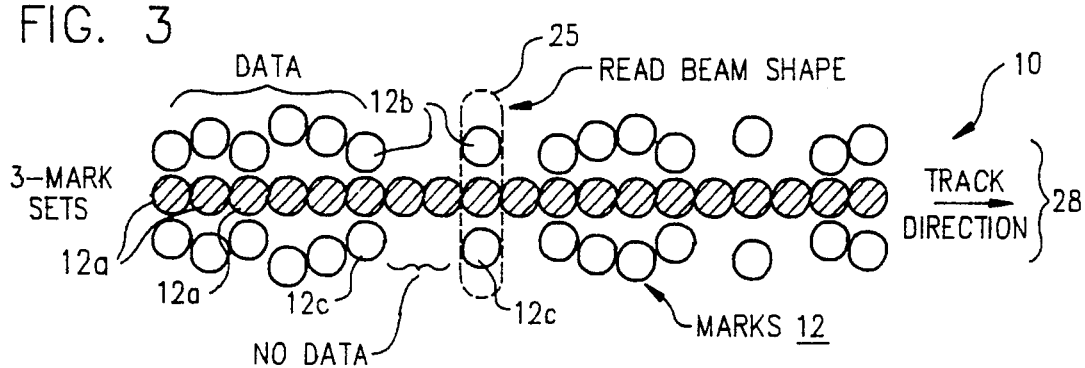
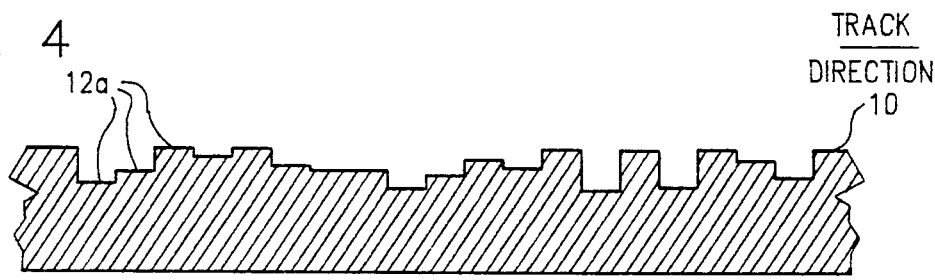
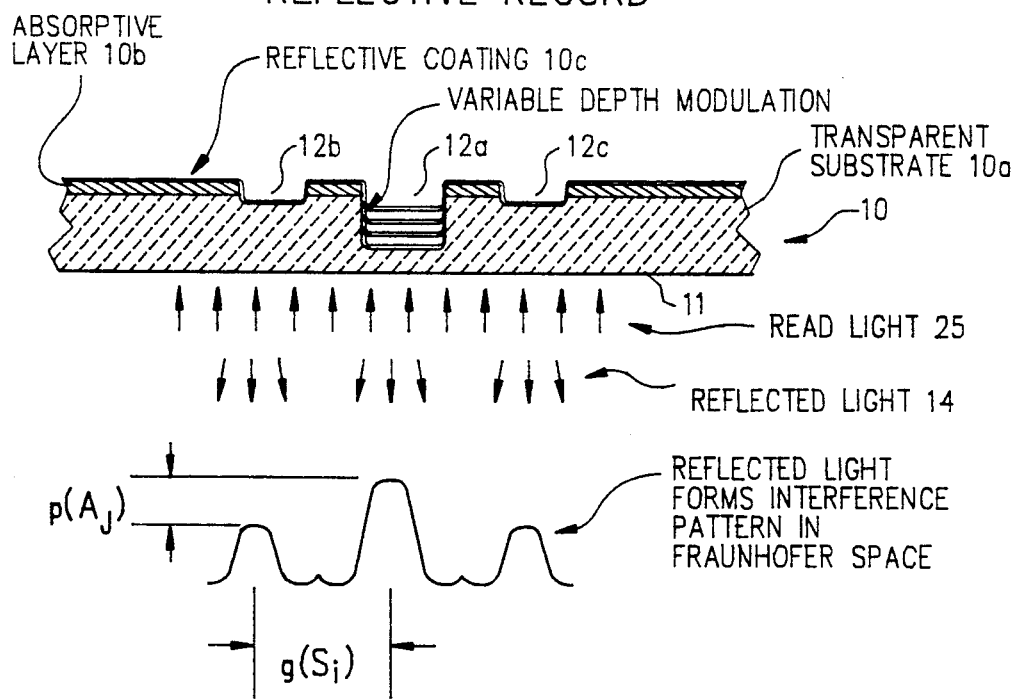

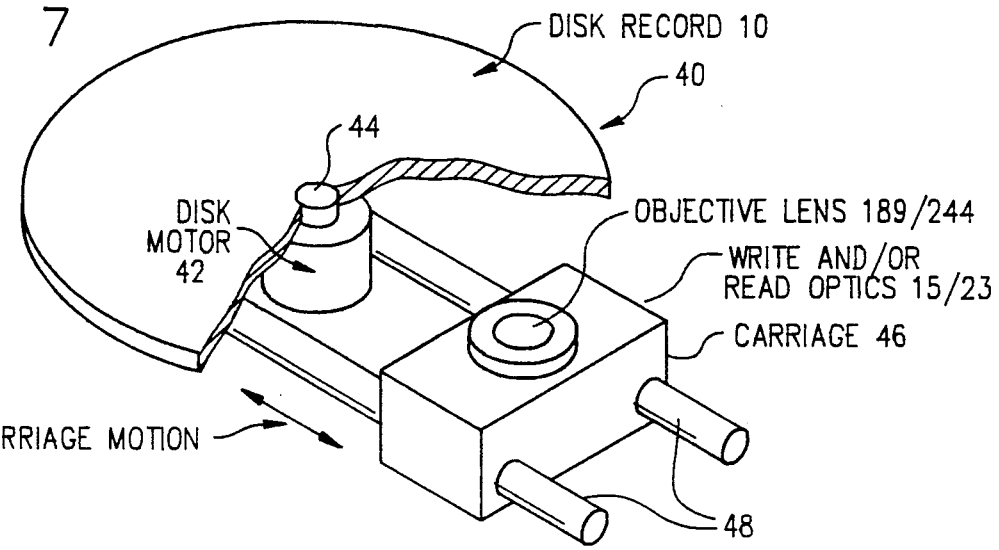
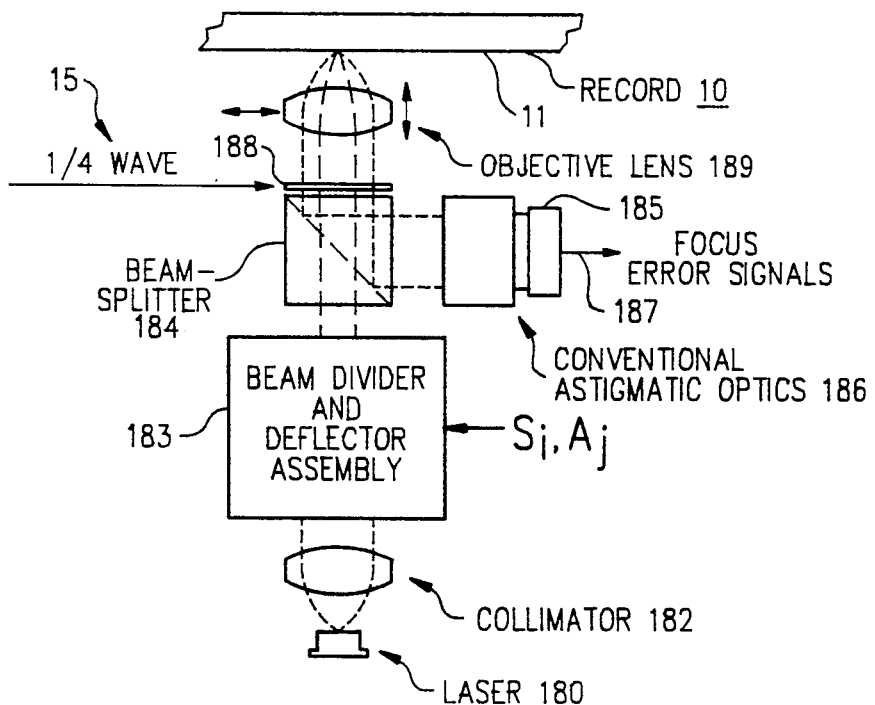

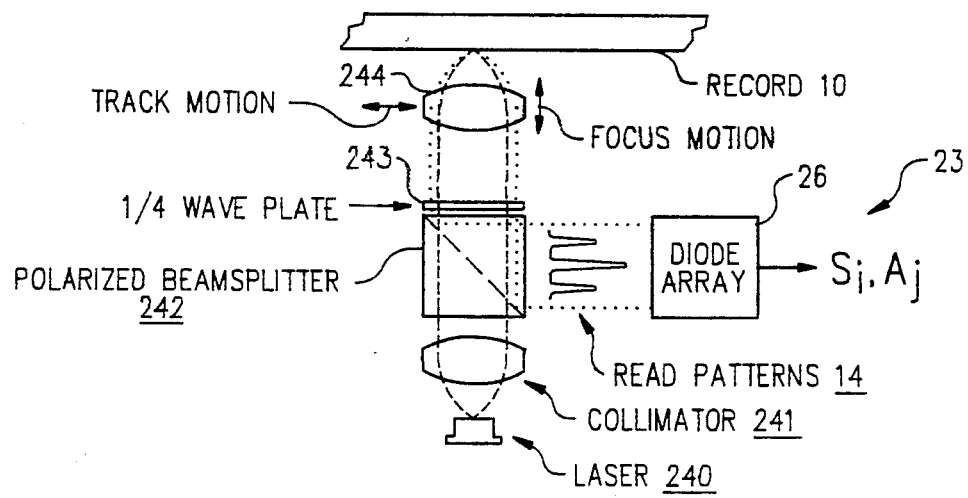
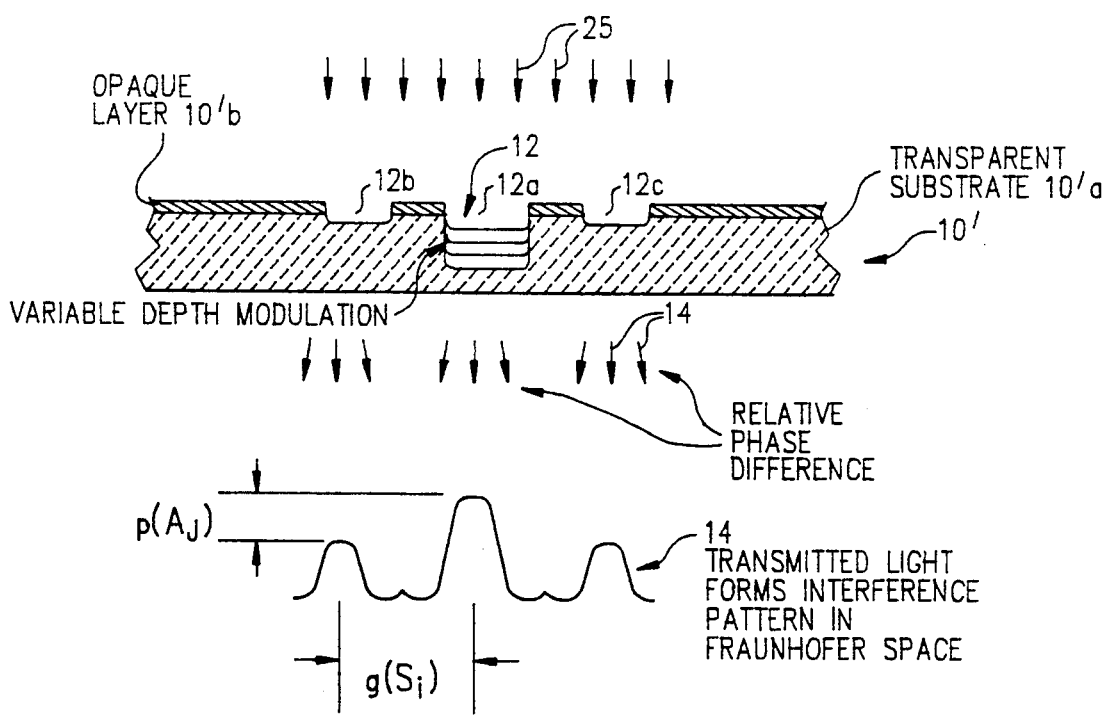

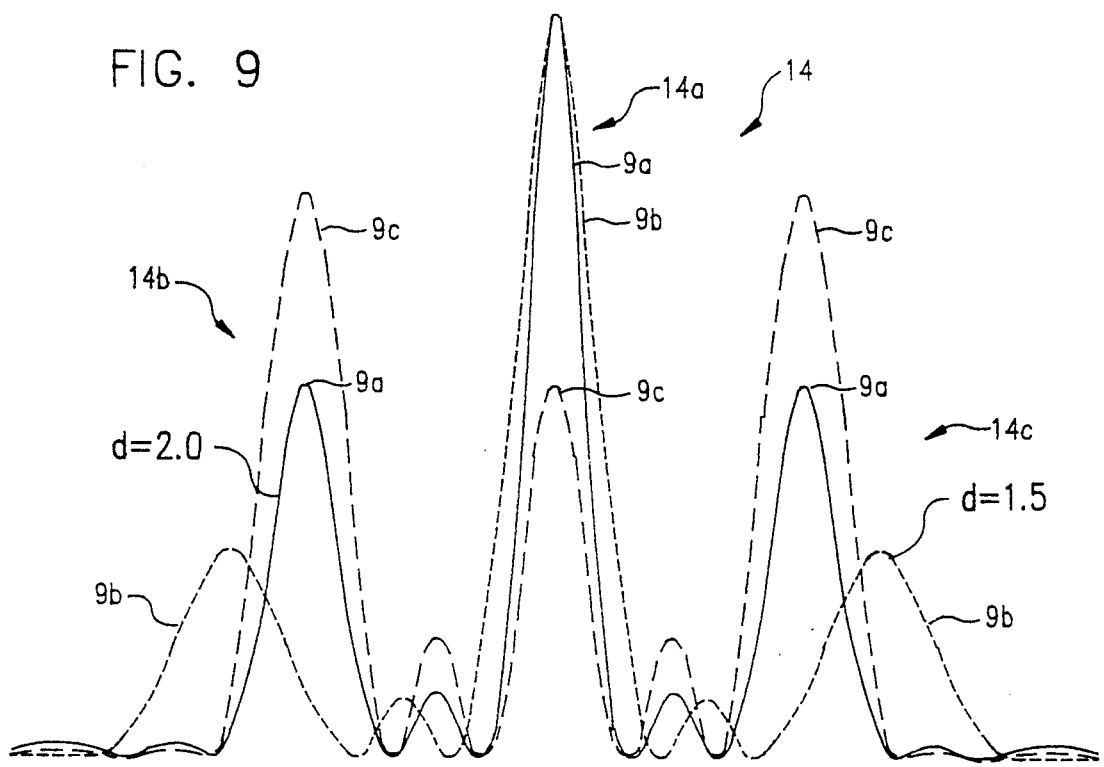
FIG. 9
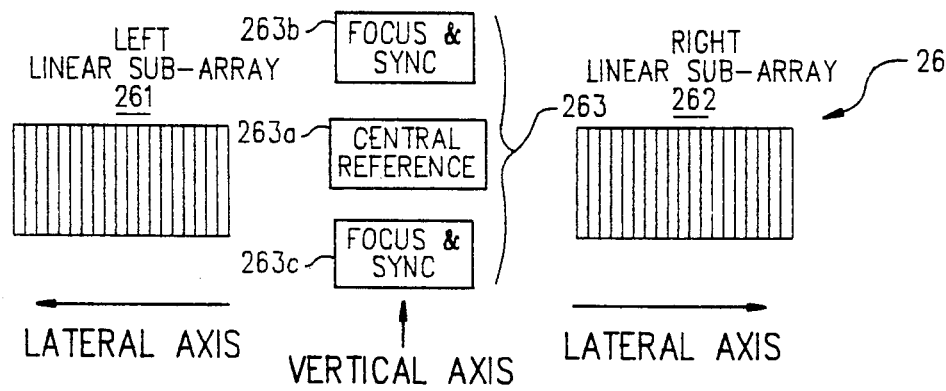
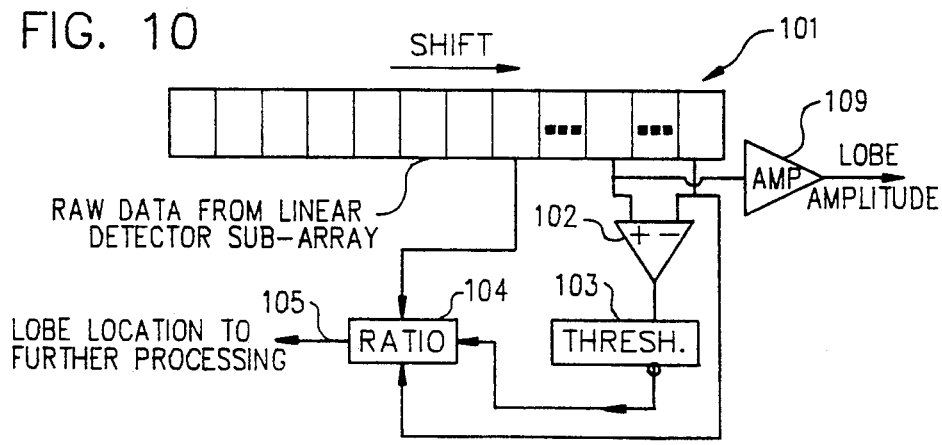
FIG. 10

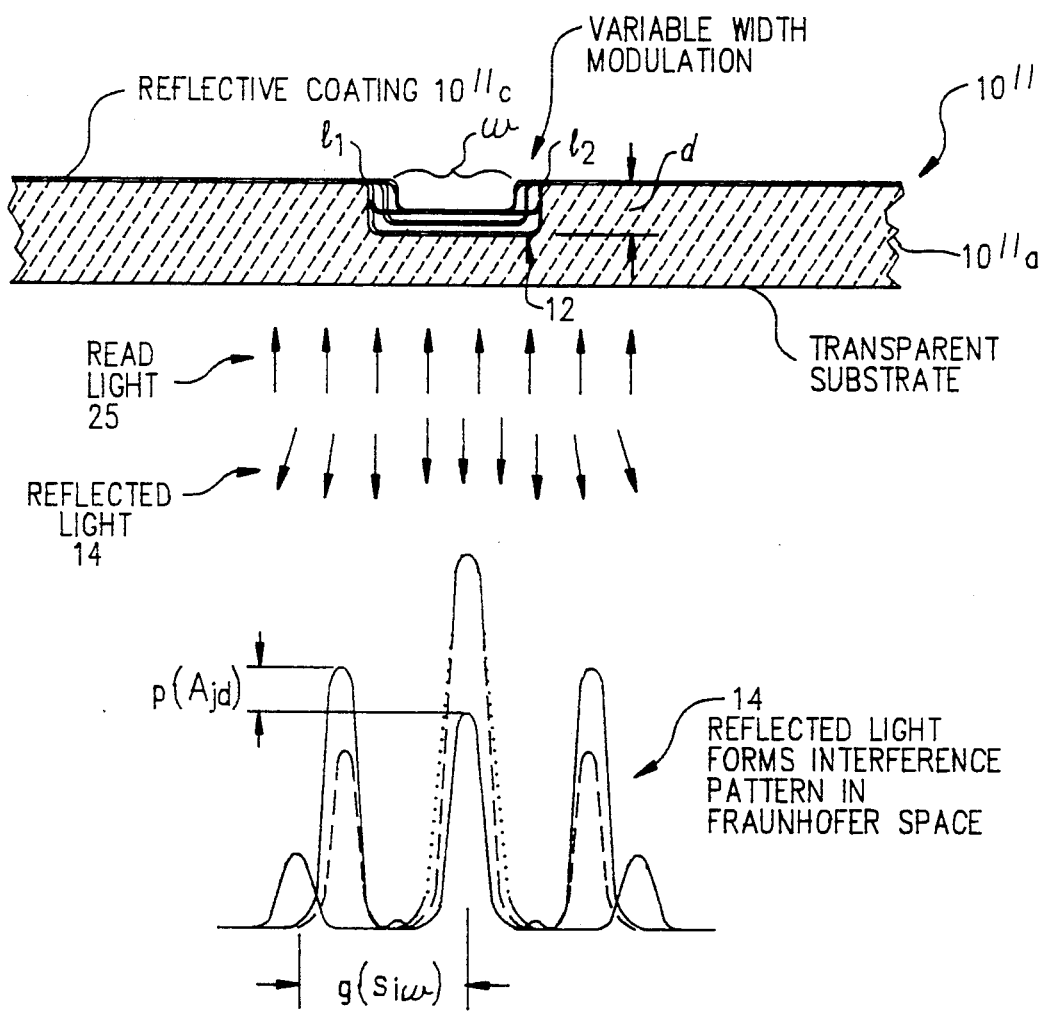

RECORDING/REPRODUCING SYSTEM USING PHASE ENCODING OF OPTICAL STORAGE MEDIUM

CROSS REFERENCE TO RELATED APPLICATIONS

This is a continuation-in-part of application Ser. No. 07/410,943 filed Sep. 22, 1989, now U.S. Pat. No. 5,056,080 issued Oct. 8, 1991; and application Ser. No. 07/614,627 filed Nov. 16, 1990.

BACKGROUND OF THE INVENTION

The subject matter of the invention relates to optical data storage in which information is recorded onto and retrieved from a record capable of storing the information in the form of optically imprintable markings and retrieving such information from these markings by optical devices.

Various forms of optical data storage are currently available for recording both digital and analog information. For example, analog data is recorded on optical disks by encoding the data in the form of variable pits or depressions along the record track, and then reading this information by electro-optical means.

Another example of existing optical data storage is provided by the popular "Compact Disc" technology in which music and other audio information is recorded onto small optical record discs that are capable of storing large amounts of prerecorded music and other audio tracks. This Compact Disc technology, made popular in the field of prerecorded music, is now being used to store computer data. Software programs and data can thus be stored on a physically small record in amounts many times greater than popular magnetic disc records. For example, a Compact Disc can store the equivalent amount of computer data that would require over one thousand "floppy" magnetic discs of the popular 5¼ size used in personal computers.

Despite the impressive advances of optical data storage techniques, there are, nevertheless, limits to the amount of information that can be recorded on an optical record. Moreover, there are significant limitations in the low rate of data recording and data access available from existing optical storage techniques. Furthermore, advances are being made in magnetic recording technology and in other storage materials to increase their storage capacity, narrowing the net advantage of optical data storage systems.

As related background to the subject invention, the existing optical data storage techniques most typically store information in the form of a series of data bits in which each bit is represented on the record as a physical mark or transition from one physical mark to the next along the direction of scan. For example, data may be recorded as a series of pits spaced along a record track. Each pit or transition between pit and surrounding land represents a single bit of data. In this prior type of optical storage, the data bit is encoded in the form of a physical mark on the record which can be read by optical means, such as by irradiating the object mark by a light source, usually from a semiconductor diode capable of emitting a small laser beam. Because each data bit requires a distinct mark, which we call an object mark, on the optical record, the amount of data that can be recorded is limited by existing means for forming the object mark and for sensing its presence or absence along the record track. In other words, each physical object mark on the record yields only one bit of data, and, of course, many hundreds of thousands of such data bits are required in order to store any significant amount of information.

Also, in regard to existing optical data storage systems, binary object marks on the record along the data track pose difficult practical problems of: tracking to insure proper alignment of the read/write optics with the data, focusing of the read/write optics to insure an adequate signal-to-noise ratio in the retrieved data, synchronizing the read electronics with recovered data bit signals, and compensation for the broad frequency band width of the detected data stream. These compensation or correction requirements for accurate tracking, focusing, and synchronizing have led to the adoption of certain sophisticated bit/word encoding schemes, such as the well known 8 to 14 code. However, such encoding techniques reduce the amount of data that can be recorded over any given unit of length along the track, and limit the effective rate of data retrieval.

It is noted that some existing optical data storage systems use diffraction light patterns for tracking. However, it is important to distinguish the use of such diffraction light patterns for such a purpose, i.e., tracking, from the present invention's use of interference light patterns as described herein for actually encoding the basic information signal in a changeable interference pattern extracted from the record during read. Existing uses of diffraction patterns are limited to the formation of side lobe sensing windows located on opposite sides of a central read lobe and merely assist in maintaining the central read lobe on track center.

The principle of the present invention is to be distinguished from certain holographic systems in which the optical interference pattern itself is recorded to enable reproduction of the holographic image.

By way of further background, reference is made to the following treatises dealing with optics and recording techniques relevant to an understanding of the present invention described herein:

General reference for single and multi-slit interference: *Fundamentals of Optics*, Jenkins and White, McGraw-Hill, 1950, Chapters 13, 15, 16, 17, and especially Sections 17.1, 17.2, and 17.3.

General reference for multi-element interference, the Fourier transform of them, and circular aperture formulas. *Fourier Optics: An Introduction*, E.G. Steward, Ellis Horwood Ltd., Publisher, Halsted Press/John Wiley & Sons, 1987, Chapters 2 and 4, and Appendix C.

*CD ROM The New Papyrus*, S. Lambert, S. Ropiequet, Eds., Microsoft Press, 1986.

*Principles of Optical Disc Systems*, G. Bouwhuis, J. Braat, A. Huijser, J. Pasman, G. van Rosmalen, K. Schouhamer Immink (all at Philips Research Laboratories, Eindhoven), Adam Hilger Ltd., 1985.

Also as additional background to this invention, see my prior U.S. Pat. No. 3,891,794 issued Jun. 24, 1975, and U.S. Pat. No. 4,090,031 issued May 16, 1978, disclosing systems data recorded in multi-layered optical records.

SUMMARY OF THE INVENTION

Therefore, it is an object of the present invention and of my earlier filed co-pending applications Ser. No. 07/410,943 and Ser. No. 07/614,627 to provide an optical storage system for increasing the amount of data that can be recorded and retrieved from a given area of the optical storage medium, i.e., increasing storage density, increasing the data rate, and at the same time facilitating tracking, focusing and synchronization. One principle of the present invention is to encode the information that is to be recorded by forming related sets of variably spaced marks on the optical record. Each such set of such marks when illuminated with coherent light causes an optical interference pattern consisting of a distribution of amplitude maxima separated by amplitude nulls (minimas) that change in accordance with the encoded information. As an example, two or more slits or holes may be formed as a set of marks in the record at each data location. A source of coherent light directed at this set of marks produces an optical interference pattern having the above characteristic maxima and minima. The information data, for example, $S_i$, which may be sampled data or a sampled analog signal, is encoded as a function $f(S_i)$ by variably controlling the separation between two or more marks of the set on the optical storage record. Thus, in the recording process, the set of physical marks, for example, two or more slits or holes, are controllably spaced so that during read the resulting optical interference pattern has detectable spacing between maxima, or minima, that varies with the information content of $S_i$. This pattern information is detectable as an output signal being a predetermined function g of the encoded information, i.e., $g(S_i)$.

The information signal Si, when extracted from the function g, is essentially in analog form having a continuum of values. Signal $(S_i)$ is thus capable of storing analog information, for example, of a value varying continuously from 0 to 1000. Alternatively, $S_i$ can represent 1000 digital values in discrete steps. Therefore each set of marks on the record track contains an order of magnitude or more information than in the single physical mark storing one binary data bit in existing optical storage systems. Although the process of the invention is basically analog, the data recorded and retrieved may itself be digital, including binary, by initially encoding the digital data into the form of an analog signal which is recorded. The retrieved analog signal is then discretely decoded back into digital at the output side of the read Bubsystem.

It is important to note that the recording and retrieving process of the invention, although basically analog, has certain features and advantages of a digital recording operation. Data are recorded and retrieved by a set of marks on the optical image that are either present or absent, making error detection easier and more reliable. The integrity of the encoded information is contained in the interference pattern itself, which is determined by the location of the average centroid of the marks, not in the clarity or edge definition of the marks. This feature results in a system that enables record duplication using existing optical copying techniques to reproduce records with substantially 100% retention of signal-to-noise quality, much like that available in the reproduction of records recorded with digital processes.

In a preferred form of the invention, a set of three marks are formed on the record for each information storage location. The physical orientation and spacing of the three mark set is such as to produce an interference pattern similar to a two mark set, but with a somewhat sharper definitional pattern of maxima and minima. Furthermore, in a three mark set, the always present centermark facilitates the use of certain focusing, tracking and synchronization techniques described in greater detail hereinafter.

In the preferred embodiment, it is recognized that more marks are required at each data location than the single mark associated with a single bit of information in the conventional optical storage systems. However, even though an extra one or two marks are used at each data location, each set of marks will represent many, e.g., several hundred or more information values because of the ability to encode significantly more information values into the variably optical interference pattern than in the single data bit mark of conventional optical recording.

In the preferred embodiment of the invention, retrieval of the recorded information is achieved by illuminating each set of marks that are arranged, for example, transverse to the scan direction, e.g., along a record track, by a laser diode source and sensing the resulting optical interference pattern by an array of semiconductor photosensors. For example, in one preferred embodiment described herein, an array of photodiodes are located at known distances from the center line of the recorded track, as determined by a tracking subsystem. The movement of side maxima (side lobes) of the resulting optical interference pattern varies the output signal from the photodiode array and thus produces a varying output signal $g(S_i)$ representing the previously recorded information. Furthermore, in this preferred embodiment, the data are recorded serially in a spiral (or concentric) track on disc, as known per se, but unique to the present invention the data consist of the sets of marks that have variable information encoding spacing transverse to the track.

Furthermore, in the preferred embodiment, each record location will contain at least one mark for synchronization, focus and/or tracking. If no data are to be recorded at a particular location, then a single mark is made and the resulting read process produces a single central maxima which is readily detected. Since the detector system will not sense any side maximas (i.e., side lobes) when only the single mark is made, the system will recognize this reproduction signal as not containing any information data and that, in turn, facilitates tracking, focusing and/or synchronization. The central maxima also provides for continuous calibration of intensity and, as a reference for the center of the track relative to which a measurement is made of the variable displacement of the side maxima (side lobes).

As a further advantage provided by the above summarized invention, there is no need to embed or record a word sync as part of the data as in the case of many conventional optical systems. Each set of marks encoding the information in the present invention can represent, itself, a multi-bit word in the form of an analog value having a digital conversion to a multi-bit value. That multi-bit word or multiple value data set is clocked as a whole at the data location by the presence of the central light maxima. Furthermore, the accuracy of reading the information is very high compared to conventional optical storage systems. Since the output information during read provides a pair of first order maxima, each pair being an encoded representation of the information signal, two independent measurements (one for each side maxima) can be made of the output function $g(S_i)$ to yield the data value $S_i$. The accuracy of the readout is not as dependent on precise tracking as in conventional optical systems, as long as all marks of a given set are illuminated by the read beam. Accuracy of the readout does not depend on the size of the marks or their edge definition, only on their relative positions which determine the optical interference pattern. A missing mark from a set, for example, one out of two marks, will cause an error; however, ordinary digital error detection correction techniques can be used in such event in the same way as existing error detection systems.

Another aspect of the present invention is the encoding of data by an optical phase shift characteristic of one or more marks, such as one mark of each set. The physical encoding of the phase modulation may take different forms such as variable depth, height, optical thickness or refractory index of a mark along the axis of the read beam, resulting in a change in the phase of the reflected or transmitted light from the coherent resource that contributes to the read interference pattern. In other words, the mark characteristic causes a variable phase shift of the transmitted or reflected read light and changes the relative amplitudes of the pattern lobes which are read and processed by the reproduction electronics. In a three mark set record, the shape and location of the interference pattern varies as a strong function of the differential phase of the light from the three spots or marks. The ratio of the intensities of the central pattern lobe to the side lobes is thus a function of the phase effect of the center spot or mark. Similarly, in an alternative two spot encoded record, a variation of the phase of one mark relative to the other will cause a rotation of the lobe pattern that also can be read and reproduced as a decoded signal.

In an alternative embodiment, the phase encoding, process, record, and reproduction may be implemented with a single spot or mark for each data location along the track. The mark in such case may have a variable depth, height, optical thickness or refractive index that relative to the land on either side of the mark causes an interference read pattern. The interference occurs between different phase components of light reflected from the mark compared to light reflected from Adjacent lands on opposite sides of the mark. By using a large enough read light pattern to capture not only the mark (e.g., a pit or raised area) but also the adjacent land areas, and using an objective lens having a sufficiently large numerical aperture (NA) to capture at least the first order or side lobes of the interference pattern, the resulting phase encoded record is read by taking a ratio between the amplitude of the center lobe and that of one or both of the first order side lobes. The phase encoded single mark recording process may be used individually or in combination with one or more of the above mentioned optical storage records and processes.

BRIEF DESCRIPTION OF THE DRAWINGS

These and further features, objects and advantages of the invention will become apparent to those skilled in the art from the following detailed description and appended drawings.

FIG. 1 is a generalized functional block diagram of the writing (recording) process in accordance with the optical data storage system of the present invention.

FIG. 2 is another generalized functional block diagram of the read operation of an optical record encoded in accordance with the system of the present invention.

FIG. 3 is a schematic diagram of recorded data using three mark data sets in each track and one mark per set having variable depth, height or thickness for phase encoding of data in accordance with the preferred embodiment of the invention.

FIG. 4 is an illustrative cross-sectional diagram of variable depth pits that form the phase encoded center marks 12a of the record of FIG. 3.

FIG. 5 is a waveform diagram of the optical interference patterns showing the encoded information signals $S_i$ and $A_j$ as variable intervals and amplitude differentials, respectively, of the interference pattern lobes.

FIG. 6 is an enlarged cross-section of a reflective recording medium taken through a 3-mark encoding set of FIG. 3, and illustrating the associated read interference pattern resulting from the illumination of the multiple mark data set.

FIG. 7 is an isometric view of a preferred form of the drive mechanism used in the present invention in which the recorded information is formatted as a continuous spiral track on an optical disc record and in which the read optics retrieve the optical interference pattern by means of illumination of and reflection from one side of the record disc.

FIG. 8a is a schematic of the write optics suitable for recording data onto an optical disc used in the drive of FIG. 7.

FIG. 8b is another schematic illustrating the read optics used in the drive of FIG. 7 for reading a prerecorded track on the optical disc.

FIG. 9 is a diagram showing a suitable arrangement of diode detector arrays disposed relative to an information encoded interference pattern that results from illuminating a multiple mark data set by means of the read optics shown in FIG. 8b in the drive of FIG. 7.

FIG. 10 is a logic circuit used to retrieve the lobe position and relative amplitude information encoded in the light interference pattern shown in FIG. 9 by means of the diode array of the read optics shown in FIG. 8b.

FIG. 13 is a diagram similar to FIG. 6, showing an alternative embodiment based on a transmission record, rather than reflective, and again illustrating the associated read interference pattern.

FIG. 14 is a diagram similar to FIG. 6 of still another embodiment of a reflective record combining variable phase and variable width encoding in each mark along a data track formed by a series of such marks.

DETAILED DESCRIPTION OF PREFERRED EMBODIMENTS

Figure 11:
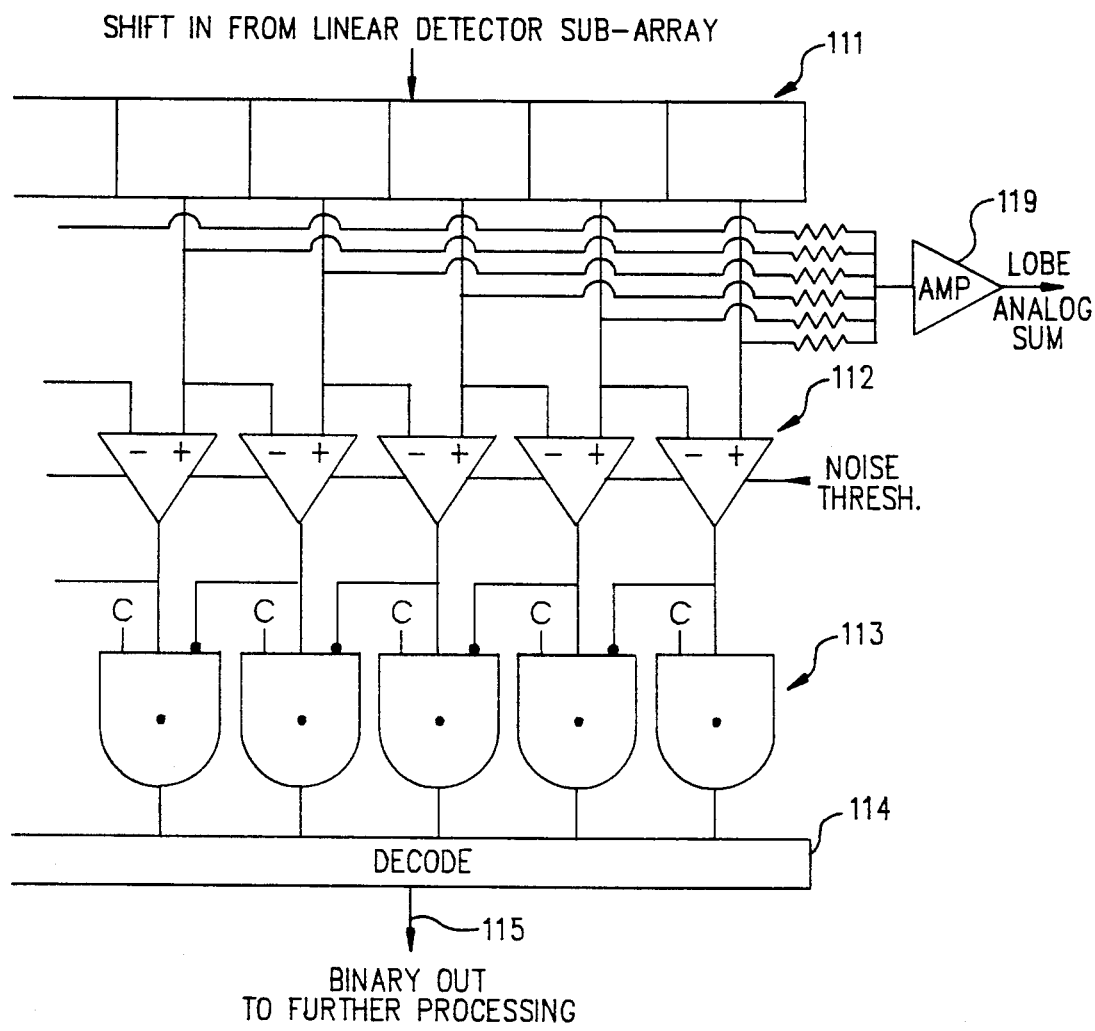
FIG. 11 is a simplified logic circuit showing an alternative signal processing scheme for retrieving the encoded data from the variable interference pattern of FIG. 9.

The principles of the recording and reading apparatus and methods of the invention are illustrated by the functional block diagrams in FIGS. 1 and 2 in which a signal $S_i$ containing information to be recorded and later retrieved is encoded onto an optical data disc 10 in the form of sets of marks 12 that develop an optical interference pattern 14 (see FIG. 2) when illuminated during a read operation by a coherent light source. This broad aspect of the invention is also disclosed in my related copending applications Ser. No. 07/410,943 and Ser. No. 07/614,627. The subject matter of this application discloses apparatus and method for recording additional signal information $A_j$ using an optical interference pattern in which the encoding is by variable shifting light phase along the optical axes, such as by varying the height, depth, optical thickness or refractory index of one of the marks relative to the others.

While a variety of recording subsystems may be used, for which specific examples are described below, FIG. 1 shows in generalized form the write optics 15 in which the input signal information ($S_i$ and $A_j$) is applied to an electro-optical beam splitter and deflector 16 to receive a source of recording light 18, preferably from a coherent source such as a laser diode, and operating on the source light beam to divide it into at least two and preferably three distinct light beams 20. The angular separation of the beams 20 is a function of the input signal information $S_i$ so that in effect the beam splitting operation is modulated by the instantaneous value $S_i$ of the information stream. The relative amplitudes of the split beams are modulated by the instantaneous value $A_j$. Arranged to be illuminated by the split recording beams 20 is the optical record 10. The variable split recording beams 20 produce a set of marks 12 that are spaced by a function $f(S_i)$ and depth, height, optical thickness or refractive index corresponding to function $h(A_j)$. The material forming optical record 10 is any of a variety of known materials, such as a synthetic base provided with a surface coating of photoresist, that are known per se to form physical marks, such as alternating reflective and non-reflective spots, when exposed to light and then developed by chemical processes. Although it is known to record information by deflecting optical beams in response to the information signal to be recorded, the preferred embodiment departs from conventional optical storage technology by encoding the input information in sets of marks 12 that are later read as a unified set.

The recorded input information is stored as variable functions $g(S_i)$ and $p(A_j)$ of an optical interference pattern 14 produced during the read operation as shown on FIG. 2. More particularly, the optical interference pattern 14 contains a function of the input signal information in the form of the quantity $g(S_i)$ in the interval separation between certain maxima or lobes of pattern 14. Here the recorded information $S_i$ is stored as a function $g(S_i)$ of the variable separation between a center maxima 14a and one or both of the first order side maxima 14b and 14c of interference pattern 14. The information $A_j$ is stored as a function $p(A_j)$ of the relative lobe amplitudes of pattern 14. To develop interference pattern 14 from each set of marks 12 on record 10, the read optics includes a coherent source of reading light 24 which produces a read beam 25. This beam illuminates each set of marks 12 along a track (usually the sets of marks will be transverse to the track and transverse to the optical axis of the read optics) so that the waves of coherent light are constructively and destructively combined in a space adjacent record 10, in this instance on the opposite side of record 10 from source 24. The result is an optical interference pattern 14 which may be detected at selected planes parallel to record 10 by a photodiode detector array 26. Array 26 develops output signal information that represents the functions g and p of the recorded and retrieved input signal information $S_i$ and $A_j$ by sensing the variable separation of the maxima lobes 14a–14c, and the amplitude differential between center lobe 14a and one or both of side lobes 14b and 14c.

It is observed that the set of marks 12 in FIGS. 1 and 2 has the capability of storing an infinite continuum of information values as a function of the variable intervals between the interference pattern maxima 14a, 14b, 14c, and variable amplitudes of these lobes. In most conventional optical storage systems, the information content stored on an optical record is in the form of a single mark representing a single bit of binary. In other words, the single mark of conventional storage records is either present or not present and represents a binary 1 or 0 value. A large number of such individual marks are required to form multi-bit words and many words are then in turn combined to form useful data streams. In contrast, the preferred embodiment of the present invention as illustrated in FIGS. 1 and 2 records a set of marks 12, in which two and preferably three marks are used as illustrated here, to form an analog recording of the information content by the variable lobes or maximas of the resulting read interference pattern 14. For example, given existing electro-optical equipment, each set of marks 12 may encode a data $S_i$ in a range of up to 1000 values with only three discrete marks 12 at each data location on record 10. In .addition, $A_j$ may store a range of values up to a similar level, e.g., 1000, for each data location. In practice, a track of information will be recorded as best seen in FIGS. 3 and 4 consisting of sets of marks, such as micron sized holes of selective depth in the optical record, with each set of marks arranged transverse to the axis of the track 28.

It is thus seen that one principle of the present invention is to encode data on a record by variably recording a track of one or more marks or spots so as to cause a phase shift in line with the axis of the read optics of reflected or transmitted light to controllably alter the relative distribution amplitudes of the resulting interference light pattern. In a preferred embodiment, the phase encoding of the record marks is combined with the encoding of data by altering the intervals between the pattern lobes due to variable spacing of multiple marks at each data location. By this combination of encoding operations, first data $S_i$, and independent thereof, second data $A_j$, may be recorded on the record for subsequent retrieval using the same record and substantially the same or similar recording and reproducing optics and electronic controls.

FIG. 3 shows the preferred three mark set 12. A plurality of mark sets are formed along track 28, with each set disposed crosswise of the track at variable spacing to a center mark 12a in order to encode first data $S_i$. The center mark 12a is present at the middle of the track for use in tracking, focusing and/or synchronizing.

Also, as indicated in FIG. 3, the center mark 12a is recorded with a variable light phase shifting characteristic relative to the adjacent marks 12b, 12c of the set in order to store the second information data $A_j$.

FIG. 4 shows a cross-section normal to the encoding record 10 and passing through the center of marks 12c. Note the variable dimension of the marks 12c normal to the record plane, and hence along the optical axis of the read/write beams.

While it might be theoretically possible to retrieve the recorded information directly by conventional forms of magnifying and measuring the physical separation and phase shifting characteristic of marks 12 from record 10, the present invention is unique in that the marks 12 are recorded at a very high density, and thus with minute separation in a range of 2 to 4 times the wavelength λ of the read light beam. For example, using an aluminum gallium arsenide laser diode, having a λ=0.78 microns, the marks 12 of each set have a separation of about 1.56 to 6.24 microns and phase shifting depth or height of 0-¼λ, or 0 to 0.19 microns. Retrieving this information from the record using conventional optics and electro-optics is difficult at best, and undesirable because of the requirement of very expensive and sophisticated read optics. Because of the high density recording of marks 12, the spacing is on the same order of magnitude as the wavelength of the light used for reading (source 24). As such, conventional imaging processes do not provide optimum resolution of the marks 12 when imaged on a photodetector or other light sensing detectors.

In the present invention, the minute spacing and phasing between the multiple marks 12 is used to advantage by forming a light interference pattern which uniquely retrieves the spacing and phase information from the multiple marks of each record set 12 in the form of the interference pattern maximas and minimas. Three marks, such as a three slit or pit set, produce a strong center maxima 14a and two relatively strong first order maximas 14b and 14c at equidistant opposite sides of the center maxima. By intercepting the interference pattern at a suitable plane offset from record 10, the spacing between these maxima is translated into an information output signal $g(S_i)$ and the relative phase as information output signal $p(A_j)$. The $g(S_i)$ signal may be derived from the variable spacing between a center lobe 14a and one of the first order side lobes or maximas 14b as illustrated in FIG. 2, or from the spacing of twice $g(S_i)$ representing the overall separation between the first order maximas, or redundant measurements can be taken for the single value function $g(S_i)$ measured from the center maxima to each first order side maxima and an average taken of the two readings. The other data signal $p(A_j)$ is extracted from the relative heights or amplitudes of the center and side maximas.

An exemplary light interference readout pattern is more specifically shown in FIG. 5. The shape of this pattern includes a large center maxima 14a and a pair of first order maxima 14b and 14c spaced symmetrically and at the same function distance $g(S_i)$ on opposite sides of the center maxima 14a. The relative amplitude of the first order side maxima 14b and 14c contain the second data function $p(A_j)$ and are roughly ⅓ to 3 times the amplitude of the center maxima 14a in the case of a three mark set. There are, of course, additional maxima that extend at greater distances from the center lobe on both sides and with diminishing amplitude; however, the useful side lobes for most practical purposes are the first order maximas 14b and 14c. In the alternative system using a two mark set for each data location, the side maxima are less sharp, although still useable.

The detailed shape of the interference pattern is here determined by four effects: the effect of a single aperture, the effect of several apertures in concert, a cosine term for the drop-off in intensity with angle, and relative phase of mark or aperture. The equation describing the pattern therefore has three terms.

The first term, the single aperture term, is usually derived from the assumption of a single slit of infinite extent and a width of a few to many wavelengths. See Eqn. 1 from, for example, E. G. Steward, *Fourier Optics: An Introduction*, Halsted Press, 1987, p. 37, or from F. A. Jenkins and H. E. White, *Fundamentals of Optics*, second ed., McGraw-Hill, 1950, p. 282. The qualitative effect of relative phase on the interference pattern is discussed hereafter.

Whenever a sharply focused, narrow read beam 25 scans across a single mark such as the no data center marks 12a in FIG. 3, the resulting light output sensed by the detector array is a single, relatively wide waveform without intervening nulls (signal minima). The shape of the wider output waveform without alternating maxima and minima that results from scanning across a single mark is used to advantage in the preferred embodiment of the present invention for tracking and focusing control as described herein in connection with FIGS. 9 and 12B.

Thus, as described more fully hereinafter, detectors located to read the centermost portion of the output waveform as well as locations on either side of such waveform enable the control electronics to detect a transition between a wider response waveform without minimas, and the multi-set interference pattern waveform 14 of FIG. 5. By processing the resulting detector output signals, tracking, synchronizing and/or focusing control signals are developed.

The intensity of the output light in waveform patterns 14 is a function of the size of the marks and the relative phasing due to variable depth, height or thickness. For example, if the marks take the form of variable phase apertures in a transmissive read system, the strength of the output light transmitted through an aperture increases with its size. However, the encoded signal information in the interval $g(S_i)$ will be independent of the size of the marks and will only vary with the spacing between the centers of each mark in the set. Furthermore, the edge definition of the marks will not significantly influence the encoded pattern interval $g(S_i)$ so that the first data $S_i$ and its retrieval are not significantly degraded by the sharpness of the marks formed on the record. The variable phase associated with the encoded lobe amplitude $p(A_j)$ may cause the second data $A_j$ to be susceptible to some degradation due to ill defined marks, but the effect is minimal and is independent of the encoded first data.

RECORD

In FIG. 6, a preferred embodiment of a reflective record 10 is shown to have a transparent substrate or base 10a of a suitable plastic, glass or ceramic material that is light transparent. Read light is passed through the substrate and reflected off the data encoding spots or marks as indicated. Since this is a reflective record, the illuminating light source and return or reflected optics are on the same side of record 10, here being indicated by arrows beneath the record.

The record lands adjacent to the pits, bumps (raised region relative to adjacent land) spots or marks 12 that encode data, are formed with a light absorptive layer 10b. Here the marks are initially formed as pits in the upper surface of a transparent base, and by selective coatings the data pits appear as reflective data bumps to illuminating read light directed from beneath the lower surface of the record 10. The absorptive layer may be made of a suitable opaque, light absorbing plastic, glass, ceramic or metal material. In those regions where data encoding spots or marks 12 are formed, the surface of transparent base 10a is formed with a reflective coating 10c so that illuminating light passing as shown in FIG. 6 from beneath record 10 strikes the coating 10c at the bottom of the pit marks 12 and is reflected back toward the read optics which include the various photo detector arrays as described below in connection with FIG. 8b. Reflective coating 10c may be of a metal material such as an aluminum or gold layer or other material that is reflective at the wavelength of the coherent read light.

The spacing of the marks 12 of record 10 as shown in FIG. 6 encode the first data ($S_i$) which produces the variable lobe intervals of the interference light pattern 14. Similarly, the relative vertical dimension of the pits or bumps forming marks 12 of record 10 determines the phase encoding of the second data ($A_j$) that is read from the changing amplitude differential between the pattern lobes. The phase of the reflected read light is influenced by the thickness of the transparent base 10a through which the light travels before it hits and is reflected back from the coating 10c at the bottom (in effect appearing as a bump relative to the absorptive land regions) of each mark 12. Illuminating light that strikes between the marks 12 passes on into the absorptive layer 10b on the lands formed at the opposite side of the record and is absorbed. In this embodiment, record 10 is encoded with a set of 3-marks per word, and the phase encoding is here achieved by varying the phase characteristic of the middle mark 12a that is along the optical read light beam axis relative to the adjacent marks 12b and 12c.

For convenience of manufacture, the record 10 is formed by coating the opposite surface from the read light with a uniform coating of the absorptive layer 10b prior to recording or forming the marks 12. Then the marks 12 are ablated or etched into the record or otherwise formed as pits so as to penetrate through and remove the absorptive layer. Finally, the reflective coating 10c is uniformly applied to the surface of record 10 opposite the read light (here the upper surface viewed in FIG. 6). The reflective coating that overlies the absorptive layer 10b is prevented from reflecting light back toward the illuminating source by the opaque absorptive layer 10b in those areas not having a pit mark. The areas of the pit marks having the absorptive layer removed allow the reflective coating 10c to be exposed to the read light for reflecting it back through the transparent base 10a toward the photodiode detector array appearing as bumps relative to absorptive layer 10b.

The amount of data that can be held in a variable phase-mark in a multi-mark word can be perhaps 10 or 12 bits if the record is a read only structure. If it is a writeable record, the number of bits may be more limited because the writing process is likely to be analog. On the other hand, a writing process that is slow enough so that closed-loop feedback control of the recording would be possible, then at least 10 bits would be feasible. For a record that must be open-loop, perhaps only three or so bits are attainable. Although this would not be a lot of data, it is in addition to other forms of storage on the same record and it is hence inexpensive.

Also, there are numerous applications for read-only records. For example, a CD-type molded record 10 can be made using three-spot words (see FIG. 3), where the center spot is varied in height, thus shifting phase. Such a record 10 then may contain three different modulations; distance between spots in a word, distance between words, and variation in phase of the center spot. The three modulations would be nearly independent, and all three would use the same set of photodetectors. The additional storage density represented by the phase modulation would come nearly without additional cost.

DISC RECORD DRIVE

In the preferred inplementation of the present invention and by way of illustrating the principles of the invention, data is recorded serially in a spiral track by an optical disc providing record 10 as shown in FIG. 7. The drive 40 for disc record 10 includes the customary disc motor 42 and spindle 44 for spinning record 10 at a controlled angular velocity. A carriage 46 slidably mounted on carriage tracks 48 movably supports the read and/or write optics 15/23 which include an objective lens arranged close to but not in contact with a surface of disc record 10. Optics 15/23 with its objective lens thus moves along a radial path with respect to the axis of disc record 10 writing onto or reading from a spiral track, or a series of concentric ring tracks, on disc record 10 as it is spun by motor 42. Alternative drives with different recording formats are contemplated and are described later in the description of alternative embodiments.

The recording on record 10 can take various forms; however, in the preferred embodiment the data is encoded in the form of reflective and non-reflective spots on one or both surfaces of the disc. As described below in connection with FIGS. 8A and 12A, the recording operation will normally involve making a master record by exposing a photoresist coating on a glass master disc with the writing beams. After writing the master disc, it is developed by etching away the photoresist to leave minute pits along the track. As exemplary dimensions, the width of a three mark data track, as it is illustrated in FIG. 3, would be about 4 microns. Each spot or mark such as marks 12a, 12b, and 12c forming a set would be on the order of one micron across. The spacing between marks would be on the order of ½ to 1 micron. The photoresist mastering process is known per se in recording data onto Compact Discs and the related laser discs. After mastering, there may be one or more intervening submasters made called "stampers" that are in turn used to form useable copies. The copies may be made from synthetic semi-rigid materials such as polycarbonate, which is a known transparent plastic used for making Compact Disc copies used in consumer equipment.

WRITE OPTICS

Drive 40, as shown in FIG. 7, may include write optics 15 with or without read optics 23 on the same carriage 46. Preferably, the writing operation will be performed by relatively high-precision, non-consumer equipment in which the tolerances of the components and the servo controls are precise for mastering. Then copies of the record can be made from the master or from "stampers" and played back on less expensive, lower tolerance drives having only read optics 23 mounted in carriage 46. Nevertheless, both read and write optics may be mounted in the same carriage in a side by side arrangement or with shared optics if desired.

Now with specific reference to FIG. 8A, the write optics 15 includes a laser diode 180 producing a polarized light beam that is then shaped by collimator 182 and passed through a beam divider and deflector assembly 183 where the light source is divided and angularly modulated in response to the data or information signal sources $S_i$ and $A_j$. The divided and modulated beams are then passed through a polarized beam splitter 184, ¼ wave plate 188, and objective lens 189 forming a write beam directed normal to the plane of the record. Reflections off the record from the write beam are deflected by splitter 184 toward focus module 185 including conventional astigmatic optics 186. Module 185 produces feedback control signals, i.e., error signals, at output 187 that are applied to focus control electronics shown in FIG. 12a and described in more detail below.

The write light beams impingent on surface 11 of record 10 appear as beams 20 having variable angular divergence or convergence and relative amplitude as shown in the recording process of FIG. 1. The objective lens 189 is movably mounted by conventional means, not separately shown, for both to and from displacement relative to record surface 11 for focus and in a plane parallel to surface 11 for tracking as indicated by the double headed arrows adjacent objective lens 189.

The beam divider and deflector assembly 183 can take various forms; however, it is preferred that an acoustooptic deflector be used to deflect the beams, and an intensity modulator in the path of the center beam be used to control the strength of the center write beam relative to the side beams.

In the operation of write optics 15, three output beams are generated when forming the three mark set 12 according to the preferred embodiment of FIG. 3, described above. As previously mentioned, the recording system is basically analog in that the spacing of the physical marks on record 10 are continuously variable in a range of variable spacing crosswise of the record track.

In the preferred embodiment, the information signals $S_i$ and $A_j$ are encoded in the variable spacing and variable phase of marks within a set of such marks arranged transverse of the record track 28 as best shown in FIG. 3, above. However, alternative embodiments disclosed in above mentioned patent applications Ser. No. 07/410,943 and Ser. No. 07/614,627 provided that additional information is stored by encoding data in variable spacing along the track as well as transverse to the track.

After mastering a record and making useable copies, it is preferable that the record surface containing recording be protected by a relatively thick transparent coating material to keep dust, scratches, etc., from degrading the read operation. Such a coating is known per se and is used on conventional Compact Discs in the form of a 1.2 mm layer of polycarbonate. For the write operation, the optical system must be of high quality with a relatively large NA (numerical aperture). This is because the system makes pits (marks) on the record that are on the order of one micron or so in diameter objective lens with an NA of at least 0.5 is preferred for recording marks of one micron.

Figure 12A:
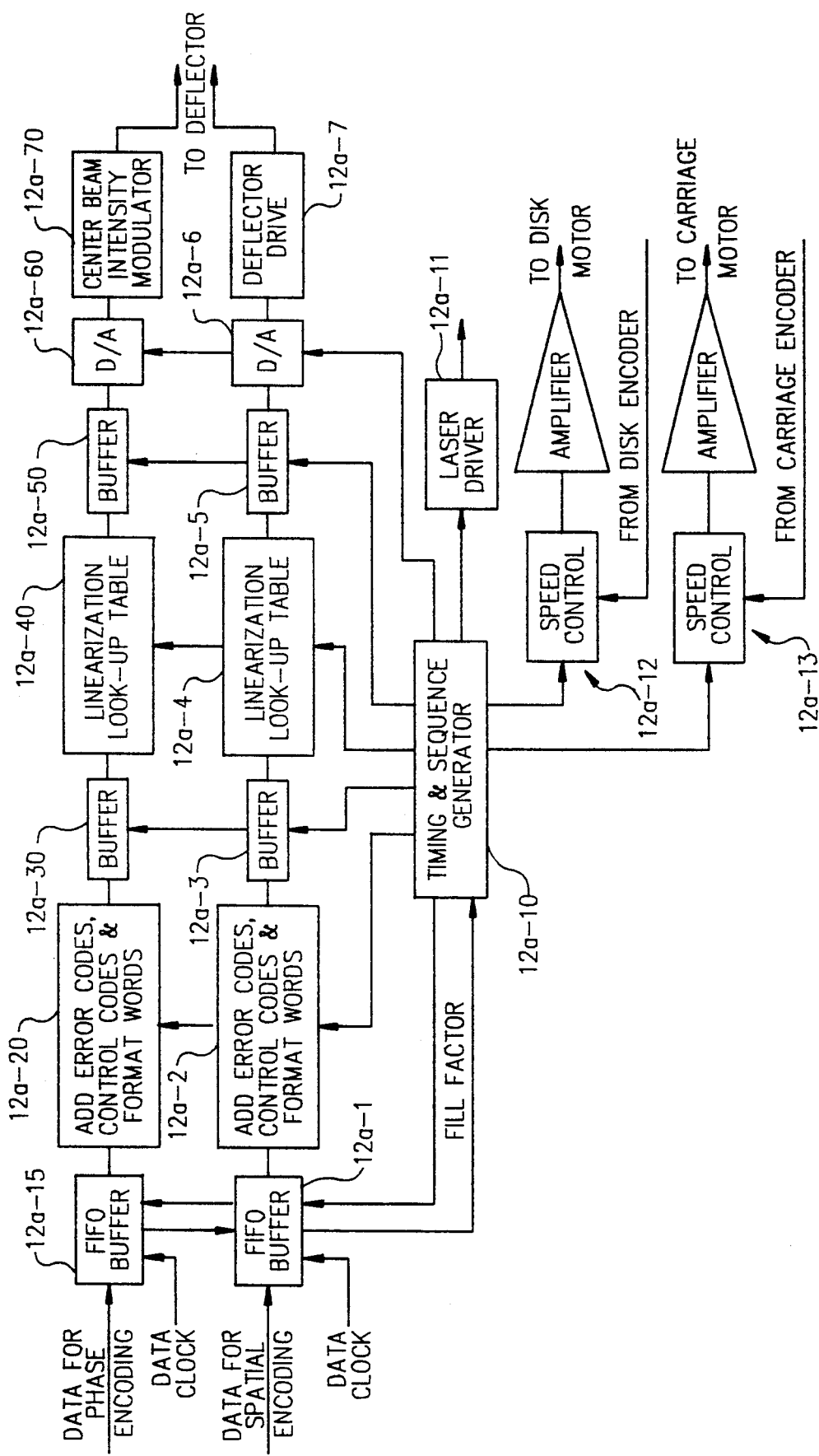
FIG. 12a is a detailed block diagram illustrating a suitable control subsystem for governing the operation of the write optics of FIG. 8a during encoding of data and recording of the optical disc.

During write operation, drive 40 and write optics 15 are governed by the write control subsystem shown in FIG. 12a. Tracking for write operations in the preferred embodiment uses conventional control technology. While a number of alternatives exist, the preferred embodiment as shown in FIG. 12a has a write control channel for spacing data $S_i$ including an FIFO buffer 12a-1 into which data is entered at a clock rate, combined with error codes, control codes, and formatted in processor 12a-2, rebuffered at 12a-3, passed through a linearization look-up table 12a-4, buffered again at 12a-5, and then applied through a digital to analog converter 12a-6 to the deflector driver 12a-7 that controls the write optics shown as beam divider and deflector assembly 183 of FIG. 8a. Another parallel write channel for phase data $A_j$ includes FIFO buffer 12a-15, processor 12a-20, buffer 12a-30, linearization look-up table 12a-40, buffer 12a-50, D-A converter 12a-60, and a center beam intensity modulator 12a-70 for encoding the phase. These components are timed and sequenced in a conventional fashion by a timing and sequence generator 12a-10 which is also coupled to the laser diode driver 12a-11 and to the disc drive motor control 12a-12 and carriage drive control 12a-13. The controls of FIG. 12a are essentially the same as currently used for recording Compact Disc masters.

In forming the multiple mark sets as they are shown in FIG. 3 by means of the write optics 18, it is preferable that each set of marks 12 nearly touch the adjacent sets. This will maximize density and still enable adequate signal-to-noise ratio during read. As described below in connection with the read operation, the close spacing of the mark sets along the track 28 means that the read beam is preferably oval in shape with the major axis oriented crosswise of the track as depicted by the dotted line oval of read beam 25 in FIG. 3.

READ OPTICS

A preferred implementation of read optics 23 is shown in FIG. 8b. At least one laser diode 240, which for example, may be provided by an aluminum gallium arsenide diode, emits coherent light of wavelength on the same order of magnitude as the dimensions of marks 12 on record 10. The coherent light is shaped by collimator 241 and passed through a polarizing beam splitter 242, a one quarter wave plate 243, and a movably mounted objective lens 244 that focuses the beam on record 10. As mentioned, it is desirable that the read beam be of generally oval shape arranged with the major axis of the oval crosswise to track 28 as shown in FIG. 3 and this requirement is readily met by most laser diodes because they inherently produce an oval beam. The optical axis of the read light beam itself is substantially normal to the plane of the record 10. Reflections from the marks on record 10 are returned through objective lens 244 back to the polarizing beam splitter that now reflects pattern 14 on the diagonal. Photodiode detector array 26 is arranged to intercept the reflected output read pattern which contains the multiple lobes or maxima 14a, 14b and 14c as shown in FIG. 5.

The quarter wave plate 243 is known per se to prevent reflections from the optics and/or record 10 from getting back into the laser diode and interfering with its operation. The plate 243 also holds losses in beam splitter 242 to a negligible amount.

Diode array 26 may take various forms as described in different alternatives below; however, in the preferred embodiment the diodes are arranged as shown in FIG. 9 relative to the interference pattern 14 in groups consisting of a left linear array 261, a right linear array 262 and a group of diodes 263 arrayed along the track which will be called the vertical axis or vertical array. The solid line pattern 9a is for reference, while the dotted line pattern 9b shows a shifting of side lobes representing $g(S_i)$ and dash line pattern 9c shows changing relative lobe amplitudes representing phase encoded p($A_j$). In particular, detectors 263 include a central reference detector 263a and a set of focus and sync detectors 263b and 263c arranged along the vertical axis above and below the central reference detector 263a. These detector diodes 263 respond to center lobe variations in the light reflection along the track as relative movement occurs between the read beam 25, as shown in FIG. 3, and the track, from one set of marks 12 to the next. The resulting output signals from these detectors are processed as described more fully below in connection with FIG. 12b to control the tracking, focusing and synchronizing of the read optics 26 and provide an amplitude measure of the center lobe for extracting the lobe amplitude ratio function p($A_j$) that yields phase encoded data $A_j$.

The left and right linear subarrays 261 and 262 include a plurality of juxtaposed diodes of sufficient number and arrangement to detect the range of lateral shifting and amplitude of each side lobe or maxima 14b and 14c of the read pattern. The position of each lobe or maxima 14b and 14c is determined by sensing those diodes which are illuminated above a detection threshold and by measuring the ratio of intensity of diode pairs that straddle a particular lobe. The detection is thus partly digital in the sense that only certain discrete diodes are illuminated above the sensing threshold and is also partially analog in that the ratio of the diode signal strength measures position of the side maxima 14b and 14c.

The encoded spacing signal data $S_i$ is extracted from the record by sensing the outputs from either or both of the left subarray 261 and/or the right subarray 262 which are at a known distance from the center of the track and hence from the center lobe or maxima 14a of the interference pattern. The dimension of each detector window in subarrays 261 and 262 is substantially smaller, in the direction of lobe movement, compared to the width of the lobe itself, i.e., lobe maxima 14b or lobe maxima 14c. On the other hand, in order to collect as much light as possible, each of the elements of subarrays 261 and 262 is much longer along the track direction than it is wide transverse to the track. While other configurations such as square or cylindrical lenses could be added to collect and focus light on the detector elements, the general geometry of elements of subarrays 261 and 262 of FIG. 9 is suitable. The detectors are preferably charge coupled devices and are accompanied by a transfer and shift register logic circuit such as shown in FIGS. 10 or 11 for extracting the signal data representing lobe movement and relative lobe amplitude from the read light pattern.

The position of the side lobe (or lobes) representing g($S_i$) is translated into an analog signal by a sensing control circuit such as shown in FIG. 10, including shift register 101, comparator 102, threshold detector 103, ratio circuit 104 and an output 105. Shift register 101 stores the positional information representing those particular diode elements of sub-arrays 261,262 that have been illuminated with a side maxima 14b or 14c. The comparator 102 has inputs coupled to a certain spaced pair of elements of register 101 and an output connected through a threshold detector 103 to an enable input of ratio taking circuit 104 so that a raising signal level in shift register 101 elements, representing the raising edge of a detected side lobe, triggers threshold detector 103 and hence ratio taking circuit 104. The inputs to circuit 104 are connected to spaced elements of register 101 selected to span the anticipated width of the side maxima. As a result, ratio taking circuit 104 is tripped on a raising leading edge of a side maxima and the ratio output signal at 105 is a measure of the center point, i.e., peak, of the maxima (lobe).

The side lobe amplitude is derived from amplifier 109 and this signal is processed with the center detector output representing central lobe amplitude. The processing of these amplitude signals is performed in the read control circuitry of FIG. 12b described below.

Alternatively, a circuit such as shown in FIG. 11 may be used for extracting the read data. To derive the lobe shift function g($S_i$), a parallel transfer occurs between the signal outputs from the diode elements of subarrays 261 and 262 into register 111. A bank of comparators 112 define the point at which the signal output from the detector array element starts to decrease, i.e., the peak of the lobe of maxima 14b or 14c. A row of AND gates 113 blocks the output of any downstream comparator 112 corresponding to an array element illuminated beyond the peak of the side lobe. The result is a single multi-bit word at the combined outputs of AND gates 113 that is fed to a decode logic 114 which decodes the position word and produces a corresponding binary output representing the location of the peak of the side lobe 14b or 14c.

Also in the alternate detection circuit of FIG. 11, side lobe amplitude is taken from summation amplifier 119. This signal is then processed as described above in connection with the output signal from amplifier 109.

SYNCHRONIZATION, FOCUS, AND TRACKING DURING READ

Figure 12B:
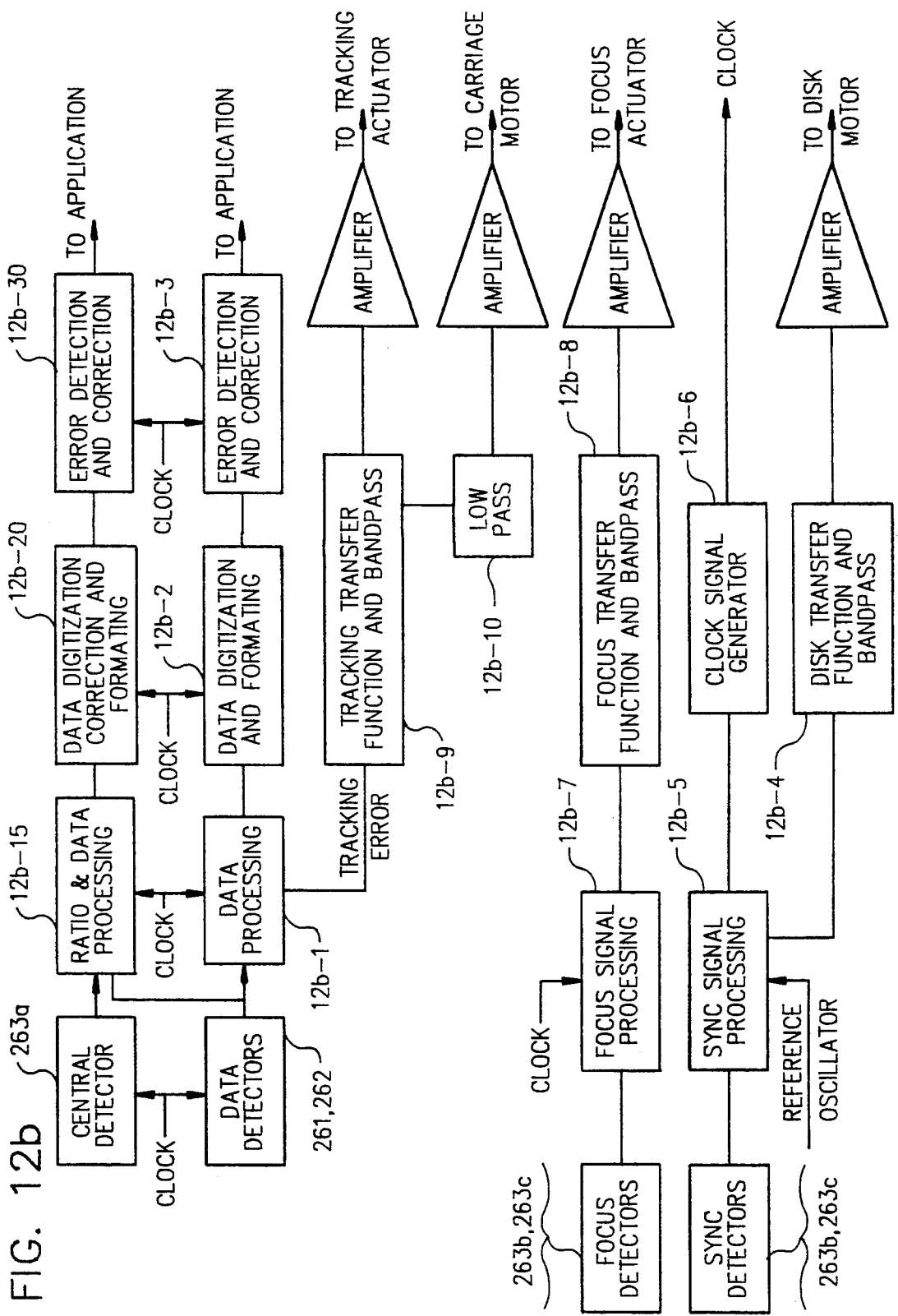
FIG. 12b is a block diagram of a suitable electronic control subsystem for operating the read optics of FIG. 8b during retrieval of data from the optical disc shown in drive 7.

A data word read from a set of marks will produce a multi-lobed pattern in a plane perpendicular to the track direction, as has been described. As shown in FIG. 12b, the data detectors of diode arrays 26 receive and process data at 12b-1, and phase encoded p($A_j$) data at 12b-15, which may be implemented as described above and shown in FIG. 10 (or FIG. 11). Then conventional digitization and formatting of data g($S_i$) occurs at 12b-2 followed by error detection and correction 12b-3, again known per se. The thusly processed data $S_i$ is then output to the particular application equipment. At the same time, the light pattern in a plane parallel, i.e., longitudinal, to the track will be that of a single spot for each lobe. When the read beam is between sets of marks, the pattern in the longitudinal direction will be that of a very closely spaced two mark set, i.e., the side lobes will be very small and widely spaced, and the central lobe will be slightly larger but not as wide as a single spot.

A ratio and data processing unit 12b-15 receives inputs of center and side lobe maximas from detectors 263a and 261, 262 and develops signal data representing phase encoded information p($A_j$). This operation is followed by conventional digitization and formatting of data p($A_j$) at 12b-20 and then error detection and correction at 12b-30 representing parallel channel processing to 12b-2 and 12b-3 described above.

Figure 12C:
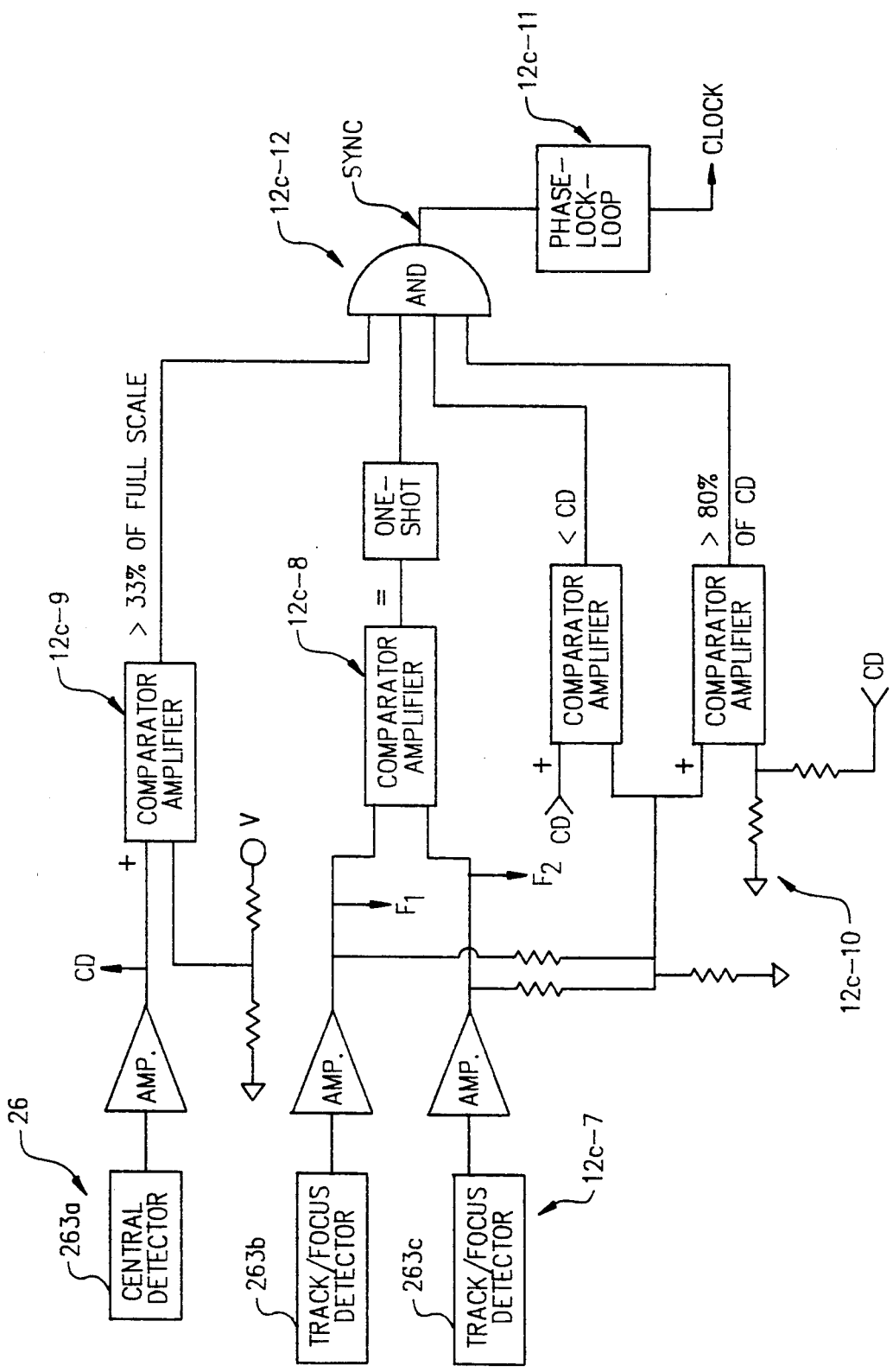
FIGS. 12c, 12d and 12e show in greater detail certain of the circuit components used in the synchronization, tracking and focusing controls for the read electronics of FIG. 12b.

A synchronizing clock signal is developed by the sync signal processing shown generally in FIG. 12b to include sync detectors of array 26, processing 12b-5, clock generator 12b-6, and disc transfer function and bandpass 12b-4, and is shown in more detail in FIG. 12c. With reference to FIG. 12c, the sync detectors 12c-7 of array 26 are aligned parallel to the track, and are set so that when the beam is on the word set, the detectors read the (one spot) central lobe, one on either side, at about 80% intensity points. Comparator amplifier 12c-8 between the track/focus detectors 12c-7 determines when the signals become equal and a pulse is then generated. If at the same time the central reference detector is high and larger than the sync signal as determined by comparator 12c-9 sensing greater than 33% of full scale, and the sync detector signal is at least half (ideally 80%) of the central reference as determined by comparators 12c-10, then AND logic 12c-12 determines that the signal condition represents a sync pulse, and it is passed on to the clock and timing circuits after stabilization by phase lock loop 12c-11. If the beam happens to be somewhere between words, the sync detectors may again be equal, but either the central reference will be low, or the sum of the sync detectors will be low, and no pulse will be passed on. Note from an examination of the pattern shapes as in FIG. 9 that the 80% intensity point on the single lobe pattern is about where there is a null in a two mark or three mark word.

Figure 12D:
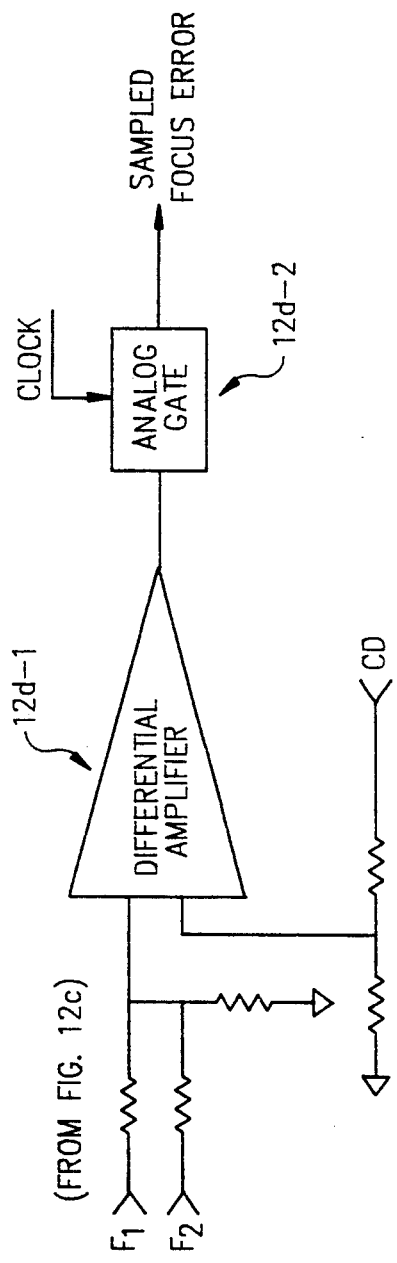

Focus processing is shown generally in FIG. 12b as focus processing 12b-7, and focus transfer function and band pass 12b-8, and a suitable circuit for these functions is more specifically set forth in FIG. 12d. As shown in FIG. 12d, the focus detectors $F_1$ and $F_2$ can be the same as the sync detectors 12c-7. When sync occurs, the sum of the detectors $F_1$ and $F_2$ is compared linearly by differential amplifier 12d-1 to the central reference. If the detectors are too close to the record, the lobe will be narrower relative to the fixed spacing of the detectors and the ratio of the sum to the central will be small. If the detectors are too far away, the lobe is much broader and lower and the ratio will be large. In practice, the sum of the detectors would be scaled with a resistor attenuator so that at correct focus the sum and the central will be equal. Then a simple differential amplifier 12d-1 will indicate by a positive or negative signal approximately how far and in which direction the focus is in error and this value is gated via clocked analog gate 12d-2 to produce the sampled focus error for controlling read optics 23. The selection of the focus is arbitrary, since there is no distinct image plane as there is in conventional systems. The "focal" point is chosen so that the pattern is sized to match a convenient detector spacing, and the beam wave front is convex.

Figure 12E:
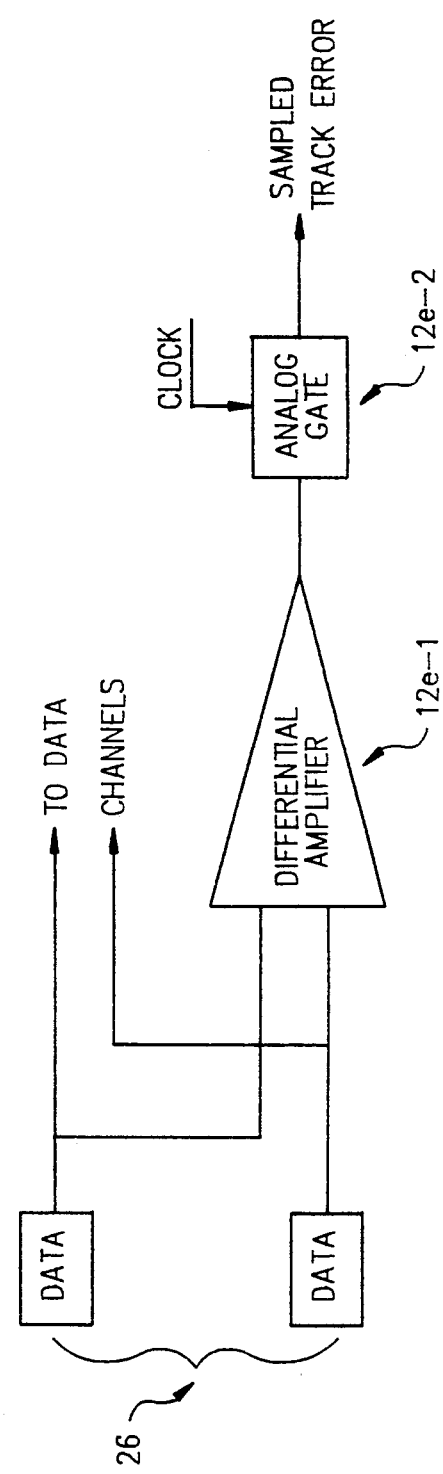

Tracking is carried out by the data processing depicted generally in FIG. 12b by tracking transfer function and band pass 12b-9 and a low pass integrator 12b-10 to produce tracking error signals for the tracking actuator and carriage motor, and a more detailed showing of this processing is set forth in FIG. 12e. The tracking signal in FIG. 12e is advantageously extracted from the data signal by taking the difference via differential amplifier 12e-1 between the left and right sets of data detectors 26. The function of tracking is to keep the center of the read beam and the center of the track coincident. If the track wanders away from the beam, the pattern will appear to shift in the opposite direction, and the detectors will no longer be symmetrically disposed with respect to the pattern and a tracking error signal results which produces a correction in the tracking actuator. The output of differential amplifier 12e-1 is selectively passed by clocked analog gate 12e-2 to the output line producing the sampled track error for the read control subsystem of FIG. 12b.

In overall operation it will be appreciated that the embodiment of the invention described above does not need word sync as a part of the recorded format, either segregated from or embedded in the data. Each set of marks, whether a three mark or two mark set, represents a multiple bit word. That word, which stores in analog form a range of values that is large enough to encode, for example, a tenbit word, allows the entire word to be clocked as a whole by the presence of the central maxima 14a.

The accuracy of reading the information from record 10 is very high compared to popular optical recording systems. As mentioned, the location of the side maxima which encode the signal information is determined by a ratio, and that ratio is easily corrected by conventional technology for intensity, and, in the case of a particular record, for temperature, wavelength, etc.

Different applications may require formatting the data on the record so that groups of words, hence groups of multi-mark sets 12, are set off by special calibration mark sets. These special mark sets are not used for data but for providing spacing calibration or to identify groups of words. The calibration marks are distinguished from the data sets such as by gaps along the record in which no marks are made either before or after or both before and after the calibration sets as illustrated the three mark and two mark recordings of FIGS. 3 and 4. The calibration sets may be used to compensate for physical distortion of the record, e.g., thermal expansion or changes in the wavelength of the read or write beams, variations in spacing of the particular diode arrays used in the equipment, or other secondary effects. Although these effects are quite small, in those applications in which a relatively large amount of data is being stored in a given data mark set, the spatial resolution becomes more critical and the above compensatory operations are desirable.

ALTERNATIVE EMBODIMENTS

FIG. 13 shows a transmission record 10' in a crosssectional view similar to that depicting the reflective record 10 of FIG. 6. In the case of transmission record 10', the illuminating read light 25 is on the opposite side of the record from the photodetector arrays. The record lands have an opaque light absorbing layer 10'b that blocks transmission of read light, and the phase encoding occurs by reason of the variable depth of the center mark 12a relative to the outboard marks 12b and 12c. The thickness of the transparent base 10'a of the record due to its index of refraction changes the phase of the transmitted light as a function of the thickness of record material 10a that the light must pass through.

As a further alternative, the reflective and transmission records 10 and 10' of FIGS. 6 and 13 may store only phase encoded data without using lobe interval encoding. In such case when data is stored in the record only in a phase encoded format, the required track to track spacing is significantly reduced since there is no variation in distance between marks of a set or between set words.

FIG. 14 shows still a further alternative embodiment of a reflective record 10" having a track of single marks that combines a type of spacing encoded data $S_{iw}$ (by varying the width of the single mark), and phase encoded data $A_{jd}$ (by varying the depth, height, or other phase characteristic of the mark). The surface of this record 10" opposite the illuminating light source is reflective both at the bottom of the pit mark as well as at lands adjacent opposite sides of the pit. The illuminating light beam is furthermore of sufficient breadth so as to span the width w of the mark (in this case the bottom of the pit) and also impinge on the adjacent land areas $l_1$ and $l_2$. Thus, the interference light pattern that is reflected from the mark 12 is influenced by the mix of the reflected light from the mark and from adjacent lands, modulating the lobe intervals as a function of mark width, and modulating relative amplitudes of the center to side lobes as a function of mark depth (or height or other phase characteristic).

Thus, as in the multi-mark record of FIGS. 3, 4 and 6, two different interrelated effects are involved in the record 10" of FIG. 14, each being available for encoding data. The depth, height, or other phase shift characteristic of the mark may be set so that the wavelength shift of reflected light along the optical read beam axis is selected to be one quarter wavelength relative to the reflected energy from the adjacent lands $l_1$ and $l_2$. In such case, the energy that combines to form the center lobe may be cancelled, and the resulting interference pattern consists of two dominant first order side lobes. Now by modulating the width w of the mark, the ratio of reflected energy from the mark (e.g., pit or bump) versus reflected light from the adjacent lands is used to rotate the side lobes toward or away from the center lobe. This modulates the lobe intervals as a function of $S_{iw}$, which is detected and processed as spacing encoded data in the same way as the detection of $g(S_i)$ in the earlier embodiment of FIGS. 3 and 5.

A change in depth (or height) of the mark while maintaining the width w constant, causes phase encoding of data $A_{jd}$. In this case, the location of the side lobes remains constant and the ratio of the amplitude of the center lobe to the side lobes varies and such variation serves to encode data $A_{jd}$. It is observed that these effects are associated with a track of single marks as depicted in FIG. 14 and require that the illuminating read beam be symmetrical about a midpoint of each mark on the track so that substantially uniform portions of adjacent lands $l_1$ and $l_2$ are illuminated and reflected to create the interference read pattern.

If there is only a series of single marks recorded along the track with variable phase shift, there will still be an interference pattern, assuming that the read beam includes land on either side of the spot. This effect is also present in conventional CDs, i.e., the modulation on the record is not amplitude, it is phase, and the difference in phase between the spot and land generates an interference pattern. However, in the case of a conventional CD recording, there is not the same use of the interference pattern for storing or retrieving data per se. The prior art CD has only two states, and the CD detector does not take the ratio of the lobe amplitudes, it only determines whether the difference between the intensity of the center lobe and that of the two first order lobes is above or below a threshold difference, hence a 1 or 0 binary data bit. Further, in the conventional CD, the NA (numerical aperture) of a typical objective lens is not large enough to capture substantially all of the pattern because the effective spacing between the contributing elements (the spot immediately adjacent land areas) causes the pattern to be very broad. So a conventional CD player is not adapted to make use of variable phase as does the above embodiment of the present invention.

However, by implementing the above alternative embodiment of the present invention with a wider reading beam, sufficient to generate and read first order lobes within the lens NA, a multi-element detector array can take a continuum of ratios between the amplitude of the central lobe and the closer first order lobes.

Thus using this embodiment of the present invention in conjunction with a conventional CD or Video Disk systems, a separate data channel is encoded into the phase of the spot, pit or mark. Such extra data may provide surround sound, or video on a CD, and have the necessary extra bandwidth for HDTV (high definition TV) on a Video Disk. In those cases where the phase modulation is not too severe, these disks recorded with the new data channel would be compatible with older players, although lacking playback of the added data.

In selecting a suitable record type for a series of single pits as shown in FIG. 14, the preferred embodiment is to use a reflective record with the adjacent land $l_1$ and $l_2$ being at an offset from the reflective bottom of the pit. Alternatively, a transmission record can be used with the pit itself being of a variable refractive index in a transparent base material without requiring reflections from either lands or the pit.

Figure 15:
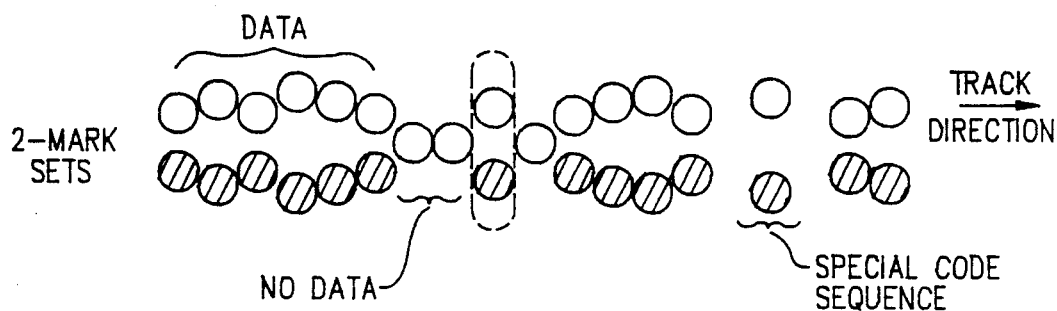
FIG. 15 is a schematic diagram similar to FIG. 3 showing an alternative embodiment of a record made of twomark sets along the track record.

In FIG. 15, a further alternative embodiment shows a view of a phase encoded record track similar to FIG. 3 but using a two mark encoding process. Variation of the phase of one mark relative to the other will cause the central and side lobes to rotate in a plane normal to the track direction and with the same sense of rotation so that the resulting encoding pattern changes asymmetrically with respect to the track. If used with the previously described read controls, this asymmetrical rotation will appear as a tracking error in the tracking electronics. However, the speed of the electromechanical tracking mechanism is slow, of the order of 100 cyles per second, compared to the word data rate which would be in the range of 1 to 10 million words/sec. Therefore, information can be encoded in the varying relative phase of one (of two) marks, provided that the positive and negative rotations of the pattern average to zero in a time that is short compared to the tracking bandwidth. In this way, the tracking will mark with essentially the same accuracy as if there was no phase modulation, but additional data can be recorded with an encoded lower band edge of about 5,000 cycles per second, i.e., of the order of 50 times the tracking bandwidth.

As yet another alternative, a magneto-optic (MO) record is coated with a strongly birefringent material. Binary data is recorded in the MO layer in a conventional way (a single spot at each position). On readout, the Kerr effect causes a small optical rotation as usual, which in turn causes a small shift in the optical phase due to the birefringent material. On readout, an interference pattern is formed between the recorded spot and the adjacent land areas. The advantages are that, first, the decision is in effect done at the record. That is, the small birefringences of the record cover or the optics will not significantly affect the result. And second, no critical adjustments of the polarizers are necessary.

Erasable data storage systems that incorporate both multi-mark (spatial and phase) encoding are feasible, but more difficult to produce. For example, a basic record may be fabricated with three-mark words, all with the same spacing, and consisting of reflective spots on an absorbing substrate. The spots may be covered with a layer of liquid crystals (frozen), or a layer of an isomer that changes volume or refractive index, or with a phase change material. The writing beam would be a single beam, only affecting the center spot. In this embodiment, the two side spots would be there only to read out the data in the center spot modulation, and also provide clocking and tracking during write and/or read operations. The side spots could hold independent data that is read only, write once, or erasable by other means.

CONCLUSION

While all the particular embodiments have been disclosed herein, it will be readily apparent to persons skilled in the art that numerous changes and modifications can be made thereto, including the use of equivalent means, devices and method steps, without departing from the spirit of the invention.

What is claimed is:

1. A system for recording information onto and reproducing such information from an optical storage medium comprising:

recording means for storing information on an optical storage medium having a data track formed by a plurality of sets of marks, each of said sets of marks encoding first data as variable spacing between marks of each of said sets of marks transverse to a read light beam axis and transverse to said data track, and encoding second data as variable optical phase shifting characteristics of said marks of each of said sets of marks that shift optical phase along the read light beam axis; and reproducing means for reading information stored in said data track, including a substantially coherent light source means that is adapted to direct a read light beam at said data track for interacting with said plurality of sets of marks, said read light beam illuminating said marks of each of said sets of marks to form from each of said sets of marks interference light patterns emanating from said medium in which intervals between maxima and/or minima of said interference light patterns are caused by said variable spacing of said marks of each of said sets of marks and represent said first data, and in which relative amplitudes of said maxima and/or minima at any point along said data track are due to said variable optical phase shifting characteristics of said marks of said sets of marks and represent said second data, said reproducing means further including photosensor means for sensing said intervals and relative amplitudes of said maxima and/or minima of said interference light patterns and for converting light therefrom into electrical signals representing said first and second data.

2. The system of claim 1 wherein said data track is formed in a plane of said optical storage medium, and said variable spacing encoding said first data is in said plane, and said variable optical phase shifting characteristics are variable height, depth, optical thickness or refractive index of said marks in dimensions of said optical storage medium substantially normal to said plane.

3. The system of claim 1 wherein said optical storage medium is a reflective record and said light source means of said reproducing means is arranged to reflect light off said marks generally along the read light beam axis.

4. The system of claim 1 wherein said optical storage medium is a transmit record and said light source means of said reproducing means is arranged on one side of said transmit record to direct the read light beam through said transmit record toward said photosensing means disposed on an opposite side of said transmit record.

5. The system of claim 1 wherein said recording means comprises beam deflection means and beam intensity modulation means for causing multiple related recording light beams to impinge upon said optical storage medium to form said marks, said beam deflection means controls said variable spacing and said beam intensity modulation means controls said variable optical phase shifting characteristics of said marks.

6. An optical data record for storing information and from which record the information can be reproduced, comprising:

an optical storage medium having a data track formed by a plurality of sets of variably spaced apart marks, each of said sets having spacing between marks of that set for encoding first information and having variable optical phase shifting characteristics of marks of that set for encoding second information, and wherein each of said plurality of sets of marks when illuminated with coherent read light form interference light patterns emanating from said optical storage medium that have intervals between maxima and/or minima that represent said spacing and hence said first information, and relative amplitudes of said maxima and/or minima that represent said variable optical phase shifting characteristics of marks within that set, and hence said second information.

7. The optical record of claim 6 wherein said data track is formed in a plane of said optical storage medium, and said spacing encoding said first information is in said plane, and said variable optical phase shifting characteristics are variable height, depth, optical thickness or refractive index of said marks in dimensions of said optical storage medium normal to said plane.

8. The optical record of claim 6 wherein said optical storage medium is a reflective record and is arranged to reflect said coherent read light off said marks.

9. The optical record of claim 6 wherein said optical storage medium is a transmit record and is arranged relative to said coherent read light so that said coherent read light is directed through said transmit record to cause said interference patterns to form on an opposite side of said transmit record.

10. A system for recording the optical record of claim 6 comprising recording means having beam deflection means and beam intensity modulation means for causing multiple related recording light beams to impinge upon said optical storage medium to form said marks, said beam deflection means for controlling said variable spacing and said beam intensity modulation means for controlling the optical phase shifting characteristics of said marks.

11. An apparatus for reproducing information from an optical storage medium having a data track formed by a plurality of sets of spaced apart marks encoding first information as variable spacing between marks of each of said sets transverse to a read light beam axis and second information as variable height, depth, optical thickness of refractive index of marks of each of said sets in a storage medium dimension substantially along the read light beam axis, comprising:

light source means having at least one frequency of substantially coherent light in a read beam adapted to be directed at said data track for interacting with said plurality of sets of spaced apart marks to form interference light patterns emanating from said optical storage medium in which intervals between maxima and/or minima represent said variable spacing, and relative amplitudes of said maxima and/or minima represent relative phase shift effects due to said variable height, depth, optical thickness or refractive index of marks in said plurality of sets; and photosensor means for sensing interference light patterns caused by interaction of said coherent light with said plurality of sets of spaced apart marks and for producing electrical signals representing said first and second information.

12. The apparatus of claim 11 wherein said optical storage medium is a reflective record and said light source means of said reproducing means is arranged to reflect light off marks in each of said sets along said read light beam axis toward said photosensor means.

13. The apparatus of claim 11 wherein said optical storage medium is a transmit record and said light source means of said reproducing means is arranged on one side of said transmit record to direct said read light beam through said transmit record toward said photosensing means disposed on an opposite side of said transmit record.

14. An apparatus for recording the optical storage medium of claim 11, comprising:

beam deflection means and beam intensity modulation means for causing multiple related recording light beams to impinge upon said optical storage medium to form marks in each of said sets wherein said beam deflection means controls said variable spacing and said beam intensity modulation means controls the relative phase shift effects of said marks.

15. A system for recording information on an optical storage medium comprising:

recording means for storing information on an optical storage medium having a data track, said data track having a plurality of sets of spaced apart marks encoding the information as variable spacing of said spaced apart marks transverse to an optical read beam axis and as variable relative dimensions of said spaced apart marks in dimensions in line with said optical read beam axis so that said sets of spaced apart marks when illuminated with a source of read light directed along said optical read beam axis form interference light patterns emanating from said optical storage medium in which intervals between maxima and/or minima of such interference light patterns represent information encoded as said variable spacing and in which relative amplitudes of said maxima and/or minima represent information encoded as said variable relative dimensions of said spaced apart marks in line with the optical read beam axis.

16. The system of claim 15 wherein said data track is formed in a plane of said optical storage medium, and said variable spacing is in said plane of said optical storage medium transverse to said data track and encodes first data, and said variable relative dimensions of said spaced apart marks are disposed normal to said plane and encode second data.

17. A method of recording information onto and reproducing such information from an optical storage medium comprising:

storing information on an optical storage medium in a data track having a plurality of sets of spaced apart marks, the spacing between marks of each of said sets being variable for encoding first information, and having variable relative height, depth, optical thickness or refractive index for encoding second information; and reading information stored in said data track by illuminating said data track with coherent read light that interacts with each of said plurality of sets of spaced apart marks to form interference light patterns emanating from said optical storage medium in which intervals between maxima and/or minima of said interference light patterns represent said spacing of said marks and relative amplitudes of said maxima and/or minima represent said variable relative height, depth, optical thickness or refractive index of said marks, and by photosensing said interference light patterns and converting photosensed light therefrom into electrical signals representing said first and second information.

18. A system for recording information onto and reproducing such information from an optical storage medium comprising:

recording means for storing information on an optical storage medium having a data track formed by a plurality of sets of spaced apart marks, each of said sets encoding the information as variable relative height, depth, optical thickness or refractive index of said spaced apart marks within each of said sets; and reproducing means for reading information stored in said data track, including light source means that is adapted to be directed at said data track for interacting with said plurality of sets of spaced apart marks to form interference light patterns emanating from said optical storage medium in which relative amplitudes of maxima and/or minima of said interference patterns represent said variable relative height, depth, optical thickness or refractive index of the marks within each of said sets, and said reproducing means including photosensor means for sensing interference light patterns caused by each of said plurality of sets of spaced apart marks in said data track and for conveying light therefrom into electrical signals representing said information.

19. The system of claim 18 wherein said optical storage medium is a reflective record and said light source means of said reproducing means is arranged to reflect light off said spaced apart marks of each of said plurality of sets toward said photosensor means.

20. The system of claim 18 wherein said optical storage medium is a transmit record and said light source means of said reproducing means is arranged on one side of said transmit record to direct read light through said transmit record toward said photosensing means disposed on an opposite side of said transmit record.

21. The system of claim 18 wherein said recording means comprises beam deflection means and beam intensity modulation means for causing multiple related recording light beams to impinge upon said optical storage medium to form said marks and in which said beam deflection means controls a variable spacing of said spaced apart marks and said beam intensity modulation means controls the height, depth, optical thickness or refractive index of said marks.

22. The system of claim 18 wherein each set of said plurality of sets of spaced apart marks comprise a center mark having said variable relative height, depth, optical thickness of refractive index that varies along said track, and a pair of outboard marks disposed transversely and symmetrically relative to the data track.

23. The system of claim 18 wherein each set of said plurality of sets of spaced apart marks comprise a pair of marks, and at least one of said marks of certain of said pairs of marks having said variable relative height, depth, optical thickness or refractive index with respect to the other mark of said certain pairs of marks.

24. A system for recording information onto and reproducing such information from an optical storage medium comprising:

recording means for storing information on an optical storage medium having a data track formed by a series of marks disposed along said data track encoding the information within said data track as variable relative height, depth, optical thickness or refractive index of the marks relative to adjacent medium lands; and reproducing means for reading information stored in said data track, including coherent light source means that is adapted to be directed at said data track for interacting with said series of marks and adjacent medium lands to form interference light patterns emanating from said optical storage medium in which relative amplitudes of maxima and/or minima of said interference light patterns represent said variable relative height, depth, optical thickness or refractive index of the marks, and said reproducing means including photosensor means for sensing said maxima and/or minima of said interference light patterns caused by said marks in said data track and for conveying light therefrom into electrical signals representing said information.

25. The system of claim 24 further comprising recording means for encoding other information as variable width of said marks in a dimension transverse to said data track, and said reproducing means including means for causing said light source means to also interact with said variable widths of said marks to cause said interference light patterns to vary in the intervals between maxima and/or minima, and said reproducing means further including means responsive to said photosensor means for decoding variations in said intervals of said patterns to reproduce said other information in addition to the first mentioned information recovered from said relative amplitudes of maximas and/or minima.

26. The system of claim 24 wherein said optical storage medium is a reflective record, and said coherent light source means is arranged on one side of said optical storage medium to reflect light off of said marks and adjacent medium lands toward said photosensor means disposed on the same side of said optical storage medium.

27. The system of claim 24 wherein said optical storage medium is a transmission record, and said coherent light source means is arranged on one side of said optical storage medium to direct light therethrough toward said photosensor means disposed on an opposite side of said optical storage medium.

28. An optical data record for storing information and from which record the information can be reproduced, comprising:

an optical storage medium having a data track formed by a series of marks disposed along said data track encoding first information as variable widths of said marks transverse to said data track and transverse to an optical read beam axis, and encoding second information as variable phase shifting characteristics in line with the optical read beam axis, and wherein said marks when illuminated with coherent read light directed along said optical read beam axis form interference light patterns emanating from said optical storage medium in which intervals between maxima and/or minima of such interference light patterns represent said variable widths of said marks and hence said first information, and relative amplitudes of said maxima and/or minima represent phase shift effects due to said variable phase shifting characteristics of said marks in line with said optical read beam axis, and hence said second information.

* * * * *